US008406386B2

(12) United States Patent
Yin et al.

(10) Patent No.: US 8,406,386 B2
(45) Date of Patent: Mar. 26, 2013

(54) VOICE-TO-TEXT TRANSLATION FOR VISUAL VOICEMAIL

(75) Inventors: Fenglin Yin, Lexington, MA (US); Jack Jianxiu Hao, Lexington, MA (US); Dahai Ren, Waltham, MA (US); Shuai Wu, Waltham, MA (US); Guanrao Chen, Woburn, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1133 days.

(21) Appl. No.: 12/334,614

(22) Filed: Dec. 15, 2008

(65) Prior Publication Data

US 2010/0150322 A1 Jun. 17, 2010

(51) Int. Cl.
*H04M 1/64* (2006.01)
(52) U.S. Cl. .................. 379/88.11; 379/88.12
(58) Field of Classification Search .......... 379/67.1, 379/68, 88.11, 88.12, 88.13, 88.14, 88.16, 379/88.22, 88.25, 88.27, 93.15, 93.17; 455/413, 455/412.2
See application file for complete search history.

(56) References Cited

U.S. PATENT DOCUMENTS

| 6,996,227 | B2 * | 2/2006 | Albal et al. ............... 379/355.05 |
| 7,103,154 | B1 * | 9/2006 | Cannon et al. ................ 379/67.1 |
| 2003/0128820 | A1 * | 7/2003 | Hirschberg et al. ......... 379/88.14 |
| 2007/0293272 | A1 * | 12/2007 | Salmon .......................... 455/566 |
| 2008/0260114 | A1 * | 10/2008 | Siminoff ..................... 379/88.14 |
| 2009/0097620 | A1 * | 4/2009 | Kim et al. ................... 379/88.17 |

* cited by examiner

*Primary Examiner* — Olisa Anwah

(57) ABSTRACT

A system may include servers. The servers may include memories including a first database to store voicemail message information associated with a voicemail mailbox and a user device, and a second database to associate a plurality of user devices with a voice-to-text transcription service; and a receiver to receive a new voicemail message associated with the voicemail mailbox. The servers may also include a processor to query to the second database to determine whether to request a voice-to-text transcription of an audio file associated with the new voicemail message and to determine whether to notify the user device of the new voicemail message before or after receiving the voice-to-text transcription of the audio file. The servers may also include a transmitter to send a notification of the new voicemail message to the user device according to the determination of whether to notify the user device of the new voicemail message before or after receiving the voice-to-text transcription of the audio file.

22 Claims, 30 Drawing Sheets

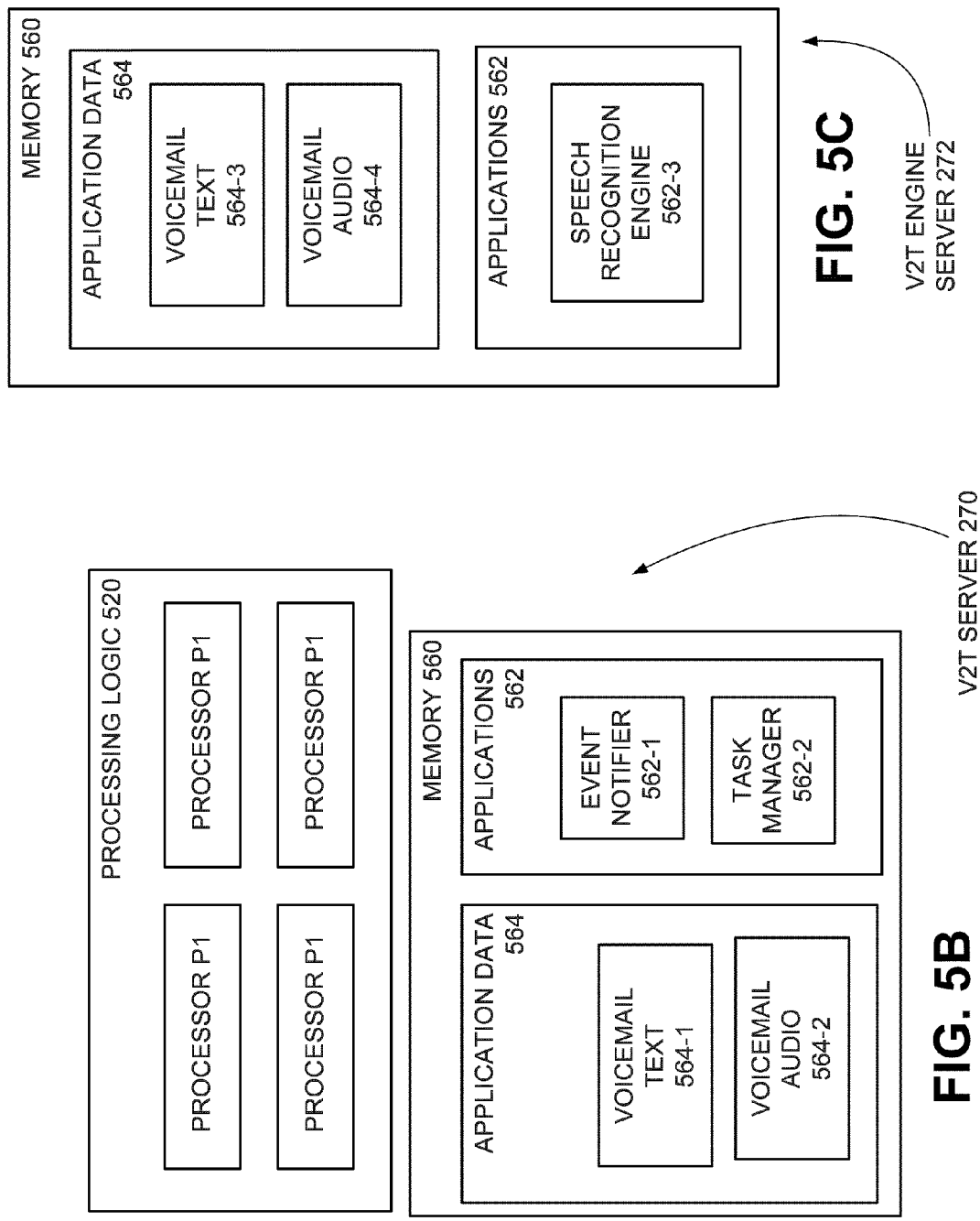

MESSAGE TABLE 600-1

| MAILBOX ID 602 | MESSAGE ID 604 | CALLED DN 605 | CALLER DN 606 | STATE 610 | AUDIO LOCATION 612 |
|---|---|---|---|---|---|
| MBA1 | A124 | 7035678989 | 2025361234 | HEARD | MSG8.QCP |

652

MESSAGE TABLE 600-2

| MAILBOX ID 602 | MESSAGE ID 604 | CALLED DN 605 | CALLER DN 606 | STATE 610 | AUDIO LOCATION 612 |
|---|---|---|---|---|---|
| MBB1 | B156 | 2023459292 | 9186321642 | SAVED | MSG2.QCP |

656

MESSAGE TABLE 600-3

| MAILBOX ID 602 | MESSAGE ID 604 | CALLED DN 605 | CALLER DN 606 | STATE 610 | AUDIO LOCATION 612 |
|---|---|---|---|---|---|
| MBC1 | C129 | 2022513434 | 2018675309 | HEARD | MSG1.QCP |

MESSAGE TABLE 600-1'

| MAILBOX ID 602 | MESSAGE ID 604 | CALLED DN 605 | CALLER DN 606 | STATE 610 | AUDIO LOCATION 612 |
|---|---|---|---|---|---|
| MBA1 | A124 | 7035678989 | 2025361234 | HEARD | MSG8.QCP |
| MBA1 | A125 | 7035678989 | 2039574986 | NEW | MSG9.QCP |

652 — (row 1)
662 — (row 2)

MESSAGE TABLE 600-2'

| MAILBOX ID 602 | MESSAGE ID 604 | CALLED DN 605 | CALLER DN 606 | STATE 610 | AUDIO LOCATION 612 |
|---|---|---|---|---|---|
| MBB1 | B156 | 2023459292 | 9186321642 | SAVED | MSG2.QCP |
| MBB1 | B157 | 2023459292 | 3016651233 | NEW | MSG3.QCP |

656 — (row 1)
658 — (row 2)

MESSAGE TABLE 600-3'

| MAILBOX ID 602 | MESSAGE ID 604 | CALLED DN 605 | CALLER DN 606 | STATE 610 | AUDIO LOCATION 612 |
|---|---|---|---|---|---|
| MBC1 | C129 | 2022513434 | 2018675309 | HEARD | MSG1.QCP |
| MBC1 | C130 | 2022513434 | 4569812124 | NEW | MSG4.QCP |

654 — (row 1)
660 — (row 2)

FIG. 6B

AGGREGATE MESSAGE TABLE 700

| MAILBOX ID 702 | MESSAGE ID 704 | CALLED DN 705 | CALLER DN 706 | STATE 710 | AUDIO LOCATION 712 | V2T STATUS 714 | TEXT LOCATION 716 |
|---|---|---|---|---|---|---|---|
| MBA1 | A124 | 7035678989 | 2025361234 | HEARD | MSG8.QCP | DELIVERED | MSG8.TXT |
| MBC1 | C129 | 2022513434 | 2018675309 | HEARD | MSG1.QCP | - | - |
| MBB1 | B156 | 2023459292 | 9186321642 | SAVED | MSG2.QCP | WAITING | - |

752 → MBA1 row
754 → MBC1 row
756 → MBB1 row

FIG. 7A

AGGREGATE MESSAGE TABLE 700'

| MAILBOX ID 702 | MESSAGE ID 704 | CALLED DN 705 | CALLER DN 706 | STATE 710 | AUDIO LOCATION 712 | V2T STATE 714 | TEXT LOCATION 716 |
|---|---|---|---|---|---|---|---|
| MBA1 | A124 | 7035678989 | 2025361234 | HEARD | MSG8.QCP | DELIVERED | MSG8.TXT |
| MBC1 | C129 | 2022513434 | 2018675309 | HEARD | MSG1.QCP | - | - |
| MBB1 | B156 | 2023459292 | 9186321642 | SAVED | MSG2.QCP | WAITING | - |
| MBB1 | B157 | 2023459292 | 3016651233 | NEW | MSG3.QCP | WAITING | - |
| MBC1 | C130 | 2022513434 | 4569812124 | NEW | MSG4.QCP | WAITING | - |
| MBA1 | A125 | 7035678989 | 2039574986 | NEW | MSG9.QCP | - | - |

V2T MESSAGE TABLE 800

| MAILBOX ID 802 | MESSAGE ID 804 | CALLED DN 805 | TIME 806 | AUDIO LOCATION 812 | VVM STATE 813 | ENGINE STATE 815 | TEXT LOCATION 816 |
|---|---|---|---|---|---|---|---|
| MBA1 | A124 | 7035678989 | T1 | MSG8.QCP | SUCCESS NOTIFIED | TEXT SAVED | MSG8.TXT |
| MBB1 | B156 | 2023459292 | T1 | MSG2.QCP | PERSISTED | UPLOAD SUCCESS | - |

V2T MESSAGE TABLE 800'

| MAILBOX ID 802 | MESSAGE ID 804 | CALLED DN 805 | TIME 806 | AUDIO LOCATION 812 | V2T NOTICE STATE 813 | ENGINE STATE 815 | TEXT LOCATION 816 |
|---|---|---|---|---|---|---|---|
| MBA1 | A124 | 7035678989 | T1 | MSG8.QCP | SUCCESS NOTIFIED | TEXT SAVED | MSG8.TXT |
| MBB1 | B156 | 2023459292 | T1 | MSG2.QCP | PERSISTED | UPLOAD SUCCESS | - |
| MBB1 | B157 | 2023459292 | T2 | MSG3.QCP | PERSISTED | UPLOAD SUCCESS | - |
| MBC1 | C130 | 2022513434 | T2 | MSG4.QCP | PERSISTED | PERSISTED | - |

| V2T SUBSCRIPTION TABLE 900 | |
|---|---|
| MAILBOX ID 902 | NOTIFICATION DN 904 |
| MBA1 | 7035678989(V2T?) 2023459292(V2T?) 2022513434(V2T?) |
| MBB1 | 2022513434 V2T |
| MBC1 | 2022513434 V2T->7035678989 |

VOICE-TO-TEXT TRANSLATION FOR VISUAL VOICEMAIL

BACKGROUND INFORMATION

Visual voicemail is a user friendly application that adds a visual aspect to managing voicemail messages. Visual voicemail may enable mobile phone users to manage voicemail message in an order of their choice, e.g., in a random order rather than a sequential order.

A voice-to-text transcription service may generate text of the content of the voicemail message (e.g., text of the content of the audio file associated with the voicemail message).

BRIEF DESCRIPTION OF THE DRAWINGS

FIGS. 5A-5C is a block diagram of exemplary components of a server computing module;

FIGS. 6A and 6B are diagrams of exemplary message tables;

FIGS. 7A and 7B are block diagrams of exemplary aggregate message tables;

FIGS. 8A and 8B are block diagrams of an exemplary voice-to-text message tables;

FIG. 9 is a block diagram of an exemplary subscription table;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Figure 1:
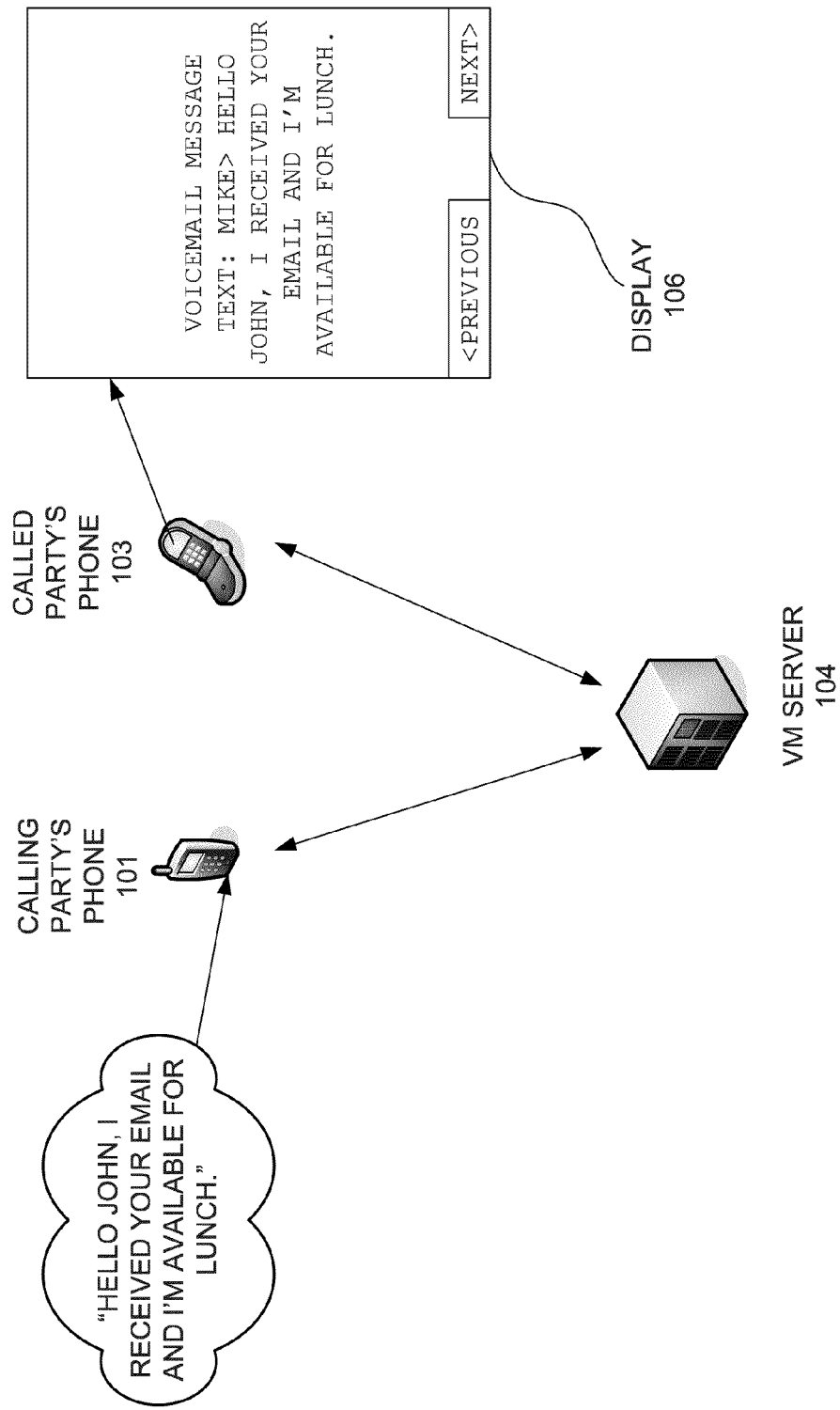
FIG. 1 is a block diagram of an exemplary environment in which embodiments described herein may be implemented.

FIG. 1 is a block diagram of an exemplary environment 100 in which embodiments described herein may be implemented. Environment 100 may include a calling party's phone 101 and a called party's phone 103. Embodiments disclosed herein may allow for the calling party (using phone 101) to call phone 103. The called party may not answer the phone and the call may be directed to voicemail. The calling party may leave a voicemail message for the called party by speaking into the microphone of phone 101. Such a voicemail message may be the spoken words: "Hello John, I received your email and I'm available for lunch." Embodiments disclosed herein may allow the called party to read the transcribed text of the voicemail message in addition to being able to listen to the voicemail message. As shown in FIG. 1, the called party may be able to read the transcribed text of the voicemail message on a display 106. In addition, environment 100 may store the transcribed text of voicemail messages so that the called party or calling party may search the text at a later time.

Figure 2:
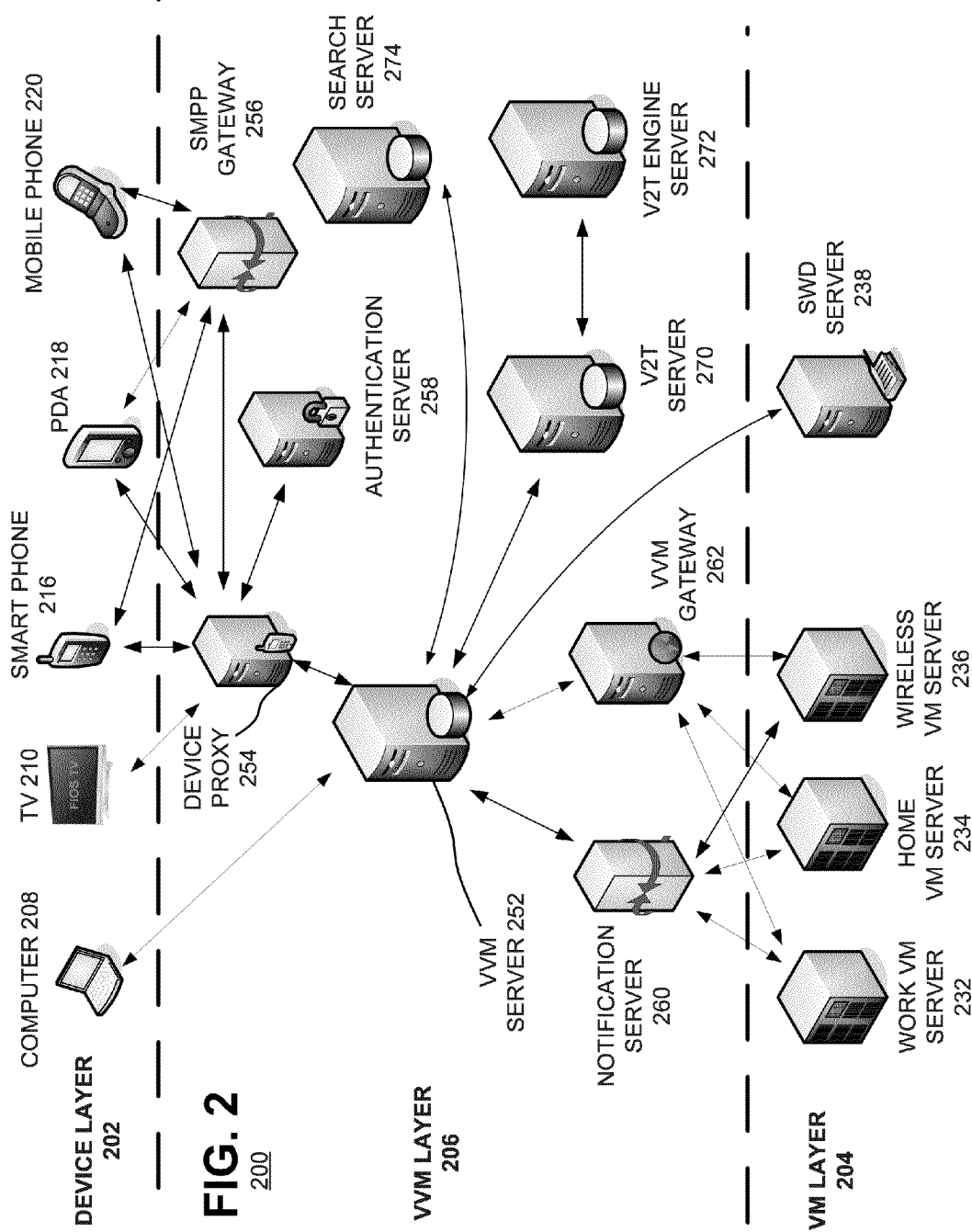
FIG. 2 is a block diagram of an exemplary network in which embodiments described herein may be implemented.

FIG. 2 is a block diagram of an exemplary network 200 in which embodiments described herein may be implemented. As shown, network 200 may include a device layer 202, a voice-mail (VM) layer 204, and a visual voicemail (VVM) layer 206. VVM layer 206 may lie between device layer 202 and VM layer 204 and may facilitate the exchange of messages (e.g., communications) between device layer 202 and VM layer 204.

Device layer 202 may include, for example, a computer 208, a television (TV) 210, a smart phone 216 (e.g., a Blackberry, Treo, etc.), a PDA 218, a mobile phone 220, and/or another type of communication device. Any of devices 208-220 may be considered user devices. VM layer 204 may include VM servers 232-236 (e.g., a work VM server 232, a home VM server 234, and a wireless VM server 236), and a service-wide directory (SWD) server 238. VVM layer 206 may include a VVM server 252, a device proxy 254, an SMPP (Short Message Peer-to-Peer Protocol) gateway server 256, an authentication server 258, a notification server 260, a VVM gateway server 262, a voice-to-text (V2T) server 270, a V2T engine server 272, and a search server 274.

Computer 208 may include one or more computer systems for hosting programs, databases, and/or applications. Computer 208 may include a laptop, desktop, or any other type of computing device. Computer 208 may include a browser application program for navigating a network, such as the Internet or network 200.

TV 210 may include a device capable of receiving and reproducing video and audio signals, e.g., a video display device. TV 210 may include a liquid crystal display (LCD), a cathode ray tube (CRT), a plasma display, etc. TV 210 may be associated with a set-top box (STB) (not shown). The STB may include a computer device, such as a cable card, for hosting programs, databases, and/or applications. TV 210 and/or the STB may include a visual voicemail application to receive, listen to, and/or send voicemail messages. TV 210 and/or the STB may be associated with a remote control (not shown). The remote control may include control keys to navigate menus displayed on TV 210, for example, and to otherwise control functions of TV 210 and/or the STB. The remote control may transmit infrared signals, or another type of signals, to an input device associated with the STB and/or TV 210.

Smart phone 216, PDA 218, and/or mobile phone 220 may allow a user to place telephone calls or send messages to other user devices. Smart phone 216, PDA 218, and/or mobile phone 220 may communicate with other devices via one or more communication towers (not shown) using a wireless communication protocol, e.g., GSM (Global System for Mobile Communications), CDMA (Code-Division Multiple Access), WCDMA (Wideband CDMA), GPRS (General Packet Radio Service), EDGE (Enhanced Data Rates for GSM Evolution), etc. In one embodiment, smart phone 216, mobile phone 220, and/or PDA 218 may communicate with other devices through a wireless network using WiFi (e.g., IEEE 802.11x) or WiMAX (e.g., IEEE 802.16x).

In other embodiments, smart phone 216, PDA 218, and/or mobile phone 220 may also communicate with other devices via a wired network. For example, smart phone 216, mobile phone 220, and PDA 218 may communicate with other devices using a public-switched telephone network (PSTN) or the Ethernet protocol. Smart phone 216, PDA 218, and mobile phone 220 may include a visual voicemail application to receive, listen to, and/or send voicemail messages.

Work VM server 232, home VM server 234, and wireless VM server 236 may each receive and store voicemail messages in mailboxes associated with one or more user devices, such as user devices 208-220. Examples of VM servers include the Lucent Automatic Call Distributor (ACD) server and the Converse Voicemail Service Node (VSN) server. VM servers 232-236 may receive voicemail messages when, for example, a user does not answer a call. VM servers 232-236 may deliver the voicemail messages when requested, for example, to one of user devices 208-220 or VVM server 252. In one embodiment, VM servers 232-236 may store video voicemail, as well as audio voicemail. In one embodiment, VVM server may aggregate voicemail information from work VM server 232, home VM server 234, and/or wireless VM server 236.

In one exemplary embodiment, user devices 208-220 may be associated with a single user. For example, a user may have been issued smart phone 216 and computer 208 (which may include a soft phone) by an employer to be used for work. The same user may own mobile phone 220 for personal use and may have TV 210 at home for family use. The same user may also own PDA 218 that may be used as a personal address book as well as a home phone. In this exemplary embodiment, work VM server 232 may receive and store voicemail for smart phone 216; home VM server 234 may receive and store voicemail for PDA 218; and wireless VM server 236 may receive and store voicemail for mobile phone 220. Although user devices 208-220 may be associated with one user in this example, VM servers 232-236 may store voicemails for more than one user (e.g., thousands or hundreds of thousands of users).

VM servers 232-236 may notify VVM server 252 of new voicemail messages by sending messages (e.g., SMPP messages) to VVM server 252 through notification server 260. VM servers 232-236 may also provide voicemail message information (e.g., voicemail message headers) to VVM server 252 by sending messages (e.g., IMAP (Internet Message Mapping Protocol) messages) to VVM server 252 through VVM gateway 262. VM servers 232-236 may also send voicemail message audio files to devices 208-220 through VVM gateway 262, VVM server 252 and/or device proxy 254, for example.

SWD server 238 may include a database of device numbers (e.g., phone numbers, mobile device numbers, Universal Resource Indicators (URIs), or Universal Resource Locaters (URLs)) and corresponding mailbox identifiers (mailbox IDs) associated with each of the device numbers. A mailbox ID may identify the mailbox used for storing voicemail messages for a corresponding device number. A mailbox ID may also identify the VM server (e.g., one of VM servers 232-236) with which the mailbox is associated. SWD 238 may also store information for associating multiple user devices, device numbers, or mailbox IDs with a single user, such as associating user devices 208-220 with the same user.

VVM server 252 may include one or more computer systems for hosting programs, databases, and/or applications. VVM server 252 may run a web server application, such as Apache, to serve web pages when requested. VVM server 252 may allow a user to access voicemail messages over a data network, for example, using computer 208. VVM server 252 may request voicemail messages and/or headers from one of VM servers 232-236 and may forward voicemail messages and/or headers to any one of devices 208-220 directly or through VVM gateway 262, device proxy 254, and/or SMPP gateway 256.

Notification server 260 may receive voicemail message notifications (e.g., SMPP messages) from VM servers 232-236. Notification server 260 may pass notifications of voicemail messages received from VM servers 232-236 to VVM server 252 (e.g., as HTTP messages).

VVM gateway 262 may receive information about voicemail messages (e.g., voicemail message headers) from VM servers 232-236. The information may include lists of voicemail messages that may include data conforming to, for example, the IMAP protocol. VVM gateway 262 may pass voicemail message headers received from VM servers 232-236 to VVM server 252. VVM gateway 262 may pass data to VVM server 252 in the form of XML (eXtensible Markup Language) data in HTTP messages, for example.

Device proxy 254 may receive communications from one or more user devices 210-220 for forwarding to other devices (e.g., VVM server 252 and/or SMPP gateway 256). Device proxy 254 may also authenticate user devices (e.g., user devices 210-220) by, for example, communicating with authentication server 258. Authentication server 258 may store information related to device authentication, such as session cookies. Device proxy 254 may communicate with devices (e.g., user devices 210-220) using secure channels implementing, for example, SSL (Secure Socket Layer) protocols or TLS (Transport Layer Security) protocols.

SMPP gateway 256 may receive SMPP (e.g., SMS (Short Message System)) messages from device proxy 254 and pass the received SMPP messages to user devices, such as user devices 216-220. SMPP gateway 256 may also receive SMPP messages from user devices 216-220, for example, and pass the received SMPP messages to device proxy 254.

V2T server 270 may receive voicemail messages (e.g., audio files) and/or headers from VVM server 252 (e.g., as XML formatted information in HTTP messages). V2T server 270 may send voicemail messages (e.g., audio files) to V2T engine server 272. VT2 engine server 272 may receive the voicemail messages (e.g., audio files) from V2T server 270 and may transcribe the received audio files into text using a voice recognition engine. The voice recognition engine may include an automatic machine voice recognition engine, a human, or both. V2T engine server 272 may send the transcribed text of the voicemail to V2T server 270 and V2T server 270 may forward the transcribed text to VVM server 252.

Search server 274 may include one or more computer systems for hosting programs, databases, and/or applications. Search server 274 may store voicemail information, including voicemail transcriptions, time of call, caller device number, calling device number, etc., so that users may perform text searches of previous voicemails.

In other embodiments, network 200 may include more, fewer, or different devices. Moreover, one or more devices 208-274 may perform one or more functions of any other device in network 200. Furthermore, one or more of devices 208-274 may be remotely located from each other, e.g., devices 208-274 may be geographically diverse. Although FIG. 2 shows devices 208-274 coupled to each other in a particular configuration, devices 208-274 may also be arranged in other configurations, either coupling directly with each other or through one or more networks, such that any one of devices 208-274 may communicate with any other one of devices 208-262. For example, any one of devices 208-274 may communicate with any other one of devices 208-274 through the Internet, an ad hoc network, a local area network (LAN), a wide area network (WAN), a metropolitan area network (MAN), a cellular network, a PSTN, a high-speed fiber optic network (e.g., FiOS™), or any other network or combinations of networks.

Figure 3:
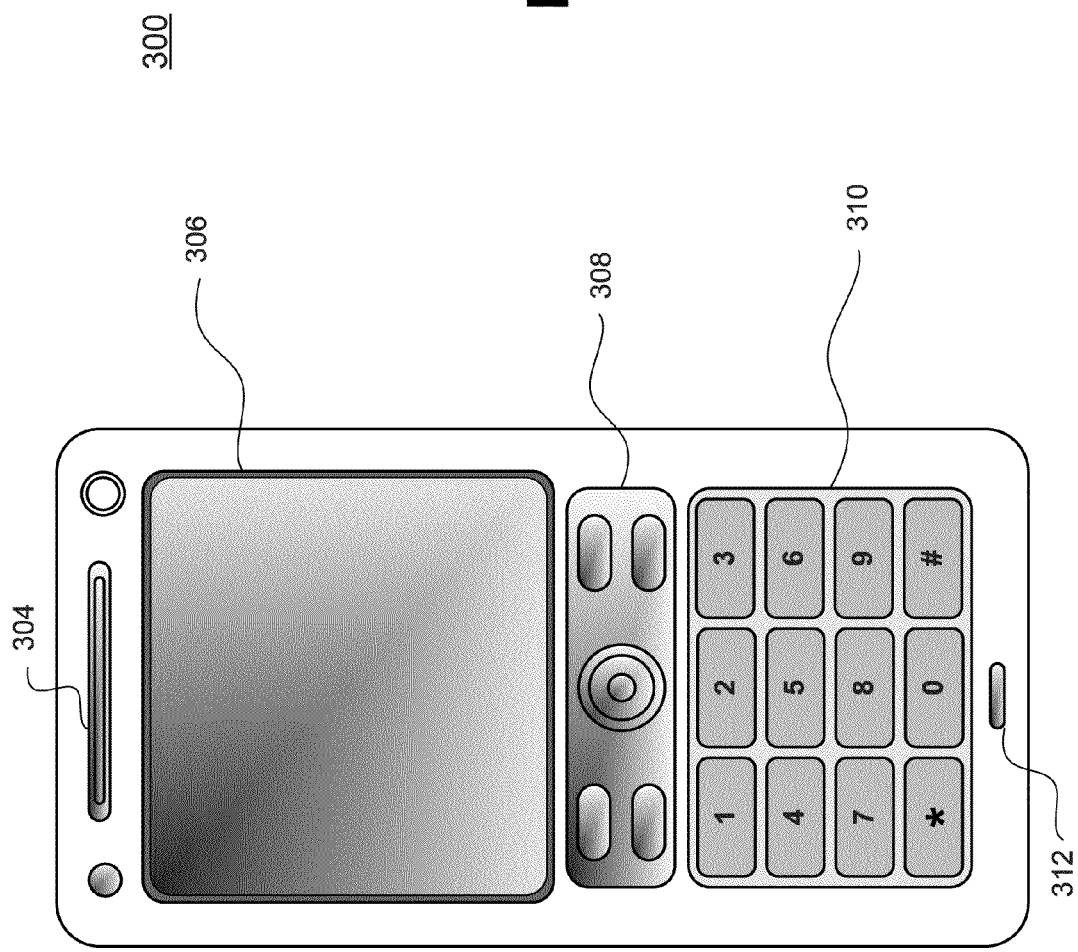
FIG. 3 is diagram of an exemplary user device.

FIG. 3 is diagram of an exemplary user device 300, such as one or more of user devices 208-220. As illustrated, user device 300 may include a speaker 304, a display 306, control keys 308, a keypad 310, and a microphone 312. User device 300 may include other components (not shown in FIG. 3) that aid in receiving, transmitting, and/or processing data. Moreover, other configurations of user device 300 are possible.

Speaker 304 may provide audible information to a user of user device 300. For example, the user may listen to voicemail messages through speaker 304. Display 306 may include a display screen to provide visual information to the user, such as video images or pictures, and may include a touch-screen display to accept inputs from the user. For example, display 306 may provide information regarding incoming or outgoing telephone calls, telephone numbers, contact information, current time, voicemail, email, etc. Display 306 may display the transcribed text of a voicemail message, as shown on display 106 of FIG. 1.

Control keys 308 may permit the user to interact with user device 300 to cause user device 300 to perform one or more operations, such as interacting with a visual voicemail application. Control keys 308 may include soft keys that may perform the functions indicated on display 306 directly above the keys. Keypad 310 may include a standard telephone or QWERTY keypad and may include additional keys to enable inputting (e.g., typing) information into user device 300. Microphone 312 may receive audible information from the user.

Figure 4:
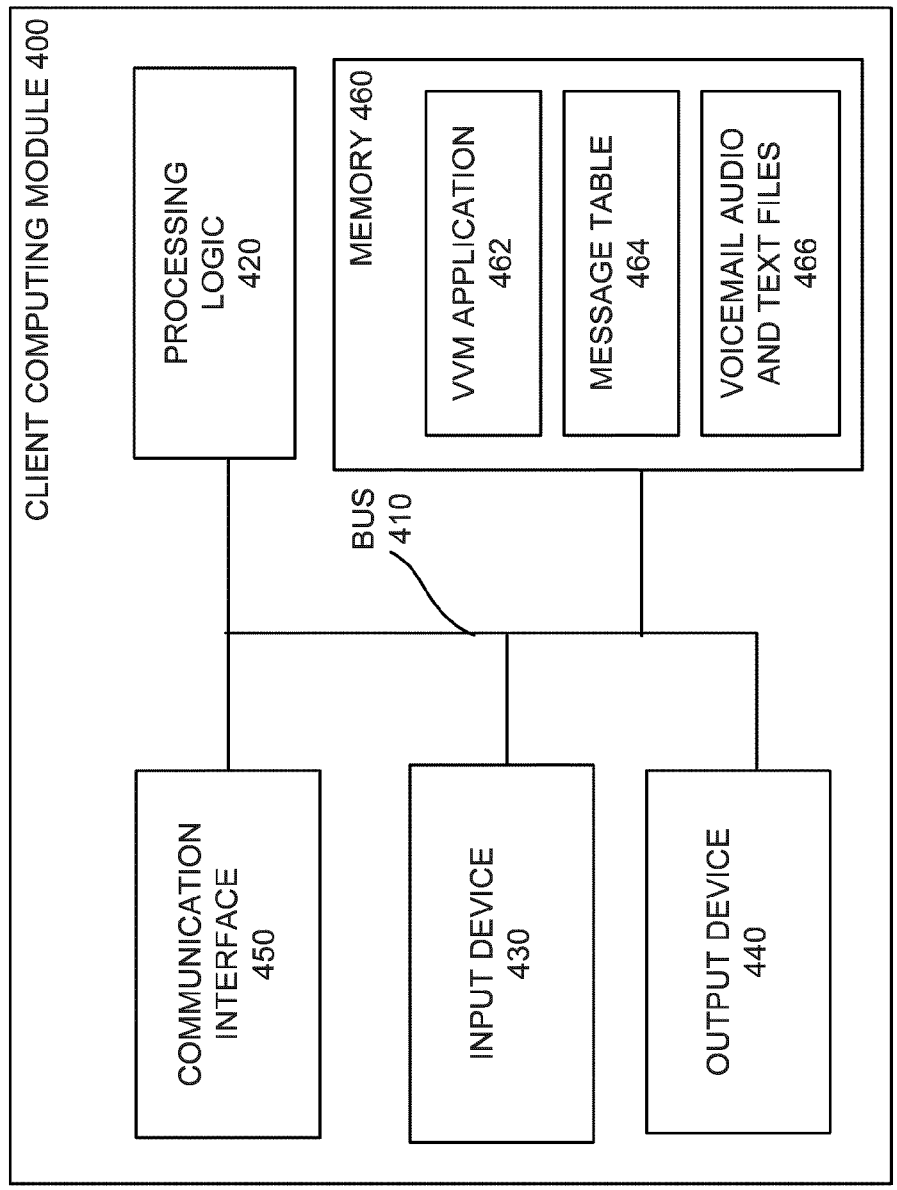
FIG. 4 is a block diagram of exemplary components of a client computing module.

FIG. 4 is a block diagram of exemplary components of a client computing module 400. User devices 208-220 may each include one or more computing modules 400. Client computing module 400 may include a bus 410, processing logic 420, an input device 430, an output device 440, a communication interface 450, and a memory 460. Client computing module 400 may include other components (not shown) that aid in receiving, transmitting, and/or processing data. Moreover, other configurations of components in client computing module 400 are possible.

Bus 410 may include a path that permits communication among the components of client computing module 400. Processing logic 420 may include any type of processor or microprocessor (or groups of processors or microprocessors) that interpret and execute instructions. In other embodiments, processing logic 420 may include an application-specific integrated circuit (ASIC), a field-programmable gate array (FPGA), or the like.

Input device 430 may include a device that permits a user to input information into client computing module 400, such as a keyboard (e.g., control keys 308 and/or keypad 310), a mouse, a pen, a microphone (e.g., microphone 312), a remote control, a touch-screen display (e.g., display 306 or display 106), etc. Output device 440 may include a device that outputs information to the user, such as a display (e.g., display 306), a printer, a speaker (e.g., speaker 304), etc.

Input device 430 and output device 440 may allow the user to activate a particular service or application, such as a visual voicemail application and/or service. Input device 430 and output device 440 may allow the user to receive and view a menu of options and select from the menu options. The menu may allow the user to select various functions or services associated with applications executed by client computing module 400.

Communication interface 450 may include any transceiver-like mechanism that enables client computing module 400 to communicate with other devices and/or systems. Communication interface 450 may include a transmitter that may convert baseband signals to radio frequency (RF) signals and/or a receiver that may convert RF signals to baseband signals. Alternatively, communication interface 450 may include a transceiver to perform functions of both a transmitter and a receiver. Communication interface 450 may be coupled to an antenna for transmission and reception of the RF signals. Communications interface 450 may include a network interface card, e.g., Ethernet card, for wired communications or a wireless network interface (e.g., a WiFi) card for wireless communications. Communication interface 450 may also include, for example, a universal serial bus (USB) port for communications over a cable, a Bluetooth™ wireless interface for communicating with Bluetooth devices, a near-field communication (NFC) interface, etc. Communication interface 450 may implement a wireless communication protocol, e.g., GSM, CDMA, WCDMA, GPRS, EDGE, etc. Communications interface 450 may also receive, transmit and/or process digital or analog audio inputs/outputs and/or digital or analog video inputs/outputs.

Memory 460 may include a random access memory (RAM) or another type of dynamic storage device that may store information and instructions, e.g., an application, for execution by processing logic 420; a read-only memory (ROM) device or another type of static storage device that may store static information and instructions for use by processing logic 420; and/or some other type of magnetic or optical recording medium and its corresponding drive, e.g., a hard disk drive (HDD), for storing information and/or instructions.

Memory 460 may include a VVM application 462, a voicemail message table 464 (e.g., database), and voicemail audio and text files 466. VVM application 462 may allow a user to receive, select, listen to, and act on (e.g., save, forward, delete) voicemail messages. Message table 464 may store a list of voicemail messages including information such as the date and time of a voicemail message, the duration of the message, the status of the message, the transcribed text of the message, etc. Voicemail audio and text files 466 may include the transcribed text and/or the audio data of the voicemails (e.g., in any format, including MP3, WMA (Windows Media Audio), AAC (Advanced Audio Coding), QCP (Qualcomm Code Prediction and/or Qualcomm Code Excited Linear Prediction), Ogg Vorbis, etc.).

Client computing module 400 may perform certain operations as described herein. Client computing module 400 may perform these operations in response to processing logic 420 executing software instructions contained in a computer-readable medium, such as memory 460. A computer-readable medium may be defined as a physical or logical memory device. The software instructions may be read into memory 460 from another computer-readable medium or from another device via communication interface 450. The software instructions contained in memory 460 may cause processing logic 420 to perform processes that are described herein.

Figure 5A:
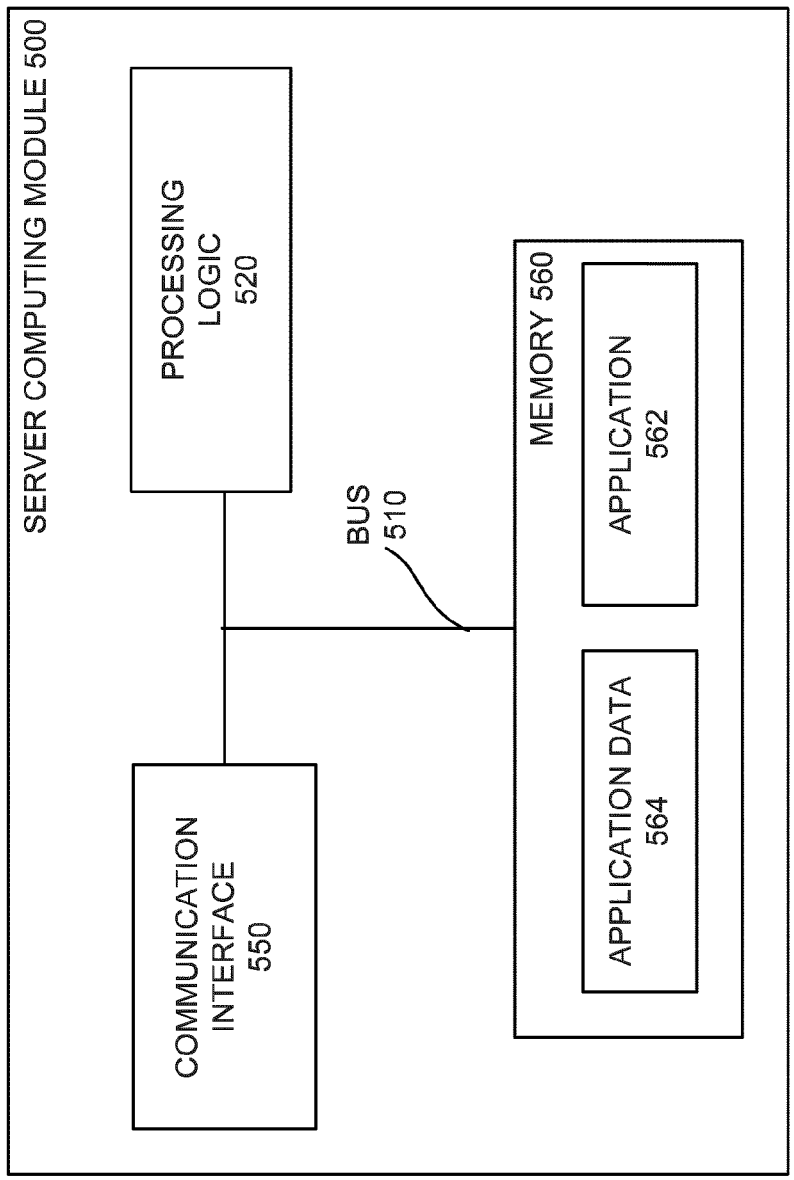

FIGS. 5A-5C are block diagrams of exemplary components of a server computing module 500. Devices 232-262 may include one or more server computing modules (e.g., a rack of server computer modules), such as computing module 500. Server computing module 500 may include a bus 510, processing logic 520, a communication interface 550, and a memory 560. Server computing module 500 may include other components (not shown) that aid in receiving, transmitting, and/or processing data. Moreover, other configurations of components in module 500 are possible.

Bus 510 may include a path that permits communication among the components of module 500. Processing logic 520 may include any type of processor or microprocessor (or groups of processors or microprocessors) that interprets and executes instructions. In other embodiments, processing logic 520 may include an ASIC, an FPGA, or the like.

Communication interface 550 may include any transceiver-like mechanism that enables module 500 to communicate with other devices and/or systems. Communication interface 550 may include a transmitter that may convert baseband signals from processing logic 520 to RF signals and/or a receiver that may convert RF signals to baseband signals. Alternatively, communication interface 550 may include a transceiver to perform functions of both a transmitter and a receiver. Communication interface 550 may be coupled to an antenna for transmission and reception of the RF signals. Communications interface 550 may include a network interface card, e.g., Ethernet card, for wired communications or a wireless network interface (e.g., a WiFi or WiMAX card) for wireless communications. Communication interface 550 may also include, for example, a USB port for communications over a cable, a Bluetooth wireless interface for communicating with Bluetooth devices, a NFC interface, etc. Communication interface 550 may implement a wireless communication protocol, e.g., GSM, CDMA, WCDMA, GPRS, EDGE, etc. Communications interface 550 may receive, transmit and/or process digital or analog audio inputs/outputs and/or digital or analog video inputs/outputs.

Memory 560 may include a RAM or another type of dynamic storage device that may store information and instructions, e.g., an application 562 and application data 564, for execution by processing logic 520; a ROM device or another type of static storage device that may store static information and instructions for use by processing logic 520; and/or some other type of magnetic or optical recording medium and its corresponding drive, e.g., a HDD, for storing information and/or instructions.

In the case of VM servers 232-236, for example, application 562 may include an application to receive voicemail messages on behalf of user devices, such as user devices 216-220, when the users of the devices do not answer call requests, for example. Application data 564 may include voicemail message tables and corresponding audio and text data.

In the case of VVM server 252, for example, application 562 may include an application to receive voicemail message information and corresponding voicemail audio data from VM servers 232-236 and deliver the received voicemail message information and corresponding voicemail audio data to user devices. Such an application may also send audio files to V2T server 270 and receive transcribed text files from V2T server 270. As such, in the case of VVM server 252, application data 564 may also include voicemail message tables and corresponding audio and text files.

In the case of V2T server 270, as shown in FIG. 5B, processing logic 520 may include four processors P1-P4 that may operate in parallel to execute different processing threads. V2T server 270 may also include an event notifier 562-1 and a task manager 562-2 (e.g., applications 562) and voicemail text 564-1 and voicemail audio 564-2 (e.g., application data 564). Task manager 562-2 may distribute tasks (e.g., processes described below) among processors P1-P4 according to a priority and whether any processors are idle, for example.

In the case of V2T engine server 270, as shown in FIG. 5C, application 562 may include a speech recognition engine 562-3 and application data 564 may include voicemail text 564-3 (e.g., output from engine 562-3) and voicemail audio 564-4 (e.g., input to engine 562-3). An example of a speech recognition engine includes Dragon Naturally Speaking.

Module 500 may perform certain operations, as described herein. Module 500 may perform these operations in response to processing logic 520 executing software instructions contained in a computer-readable medium, such as memory 560. The software instructions may be read into memory 560 from another computer-readable medium or from another device via communication interface 550. The software instructions contained in memory 560 may cause processing logic 520 to perform processes that are also described herein.

FIG. 6A is a diagram of exemplary message tables 600-1, 600-2, and 600-3, e.g., databases (collectively "message tables 600"). Message tables 600 may each store information related to voicemail messages. Each entry (e.g., record) in message tables 600 may include information regarding a different voicemail message.

Message tables 600 may be stored in one or more of VM servers 232-236 (e.g., in memory 560). In one exemplary embodiment, message table 600-1 may store information regarding messages associated with smart phone 216; message table 600-2 may store information regarding messages associated with PDA 218; and message table 600-3 may store information regarding messages associated with mobile phone 220. In this exemplary embodiment, message table 600-1 may be stored in work VM server 232; message table 600-2 may be stored in home VM server 234; and message table 600-3 may be stored in wireless VM server 236. In other embodiments, message tables 600 may also be stored in another device in network 200, such as in VVM server 252 (e.g., in memory 560) or any of devices 208-220 (e.g., in memory 460 as message table 464).

Message tables 600 may include a mailbox identifier ("mailbox ID" or "MBID") field 602, a message identifier ("message ID" or "MID") field 604, a called device number (DN) field 605, a caller DN field 606, a state field 610, and an audio location field 612.

Mailbox ID field 602 may include a value identifying a mailbox in one of VM servers 232-236. In exemplary message tables 600, there are three mailboxes identified in mailbox ID field 602: MBA1, MBB1, and MBC1. In this example, MBA1 may be a mailbox in work VM server 232 associated with smart phone 216, MBB1 may be a mailbox in home VM server 234 associated with PDA 218 and, and MBC1 may be a mailbox in wireless VM server 236 associated with mobile phone 220.

Message ID field 604 may include a value that may uniquely identify a voicemail message in a mailbox. For example, record 652 in message table 600-1 stores a message identifier of A124 in message ID field 604.

Called DN field 605 may include a device number (e.g., phone number, mobile device number, URI, or URL) for which the corresponding voicemail message is intended. In exemplary message tables 600, there are three device numbers in called DN field 605: 2022513434, 7035678989, and 2023459292. In this example, the device number 2022513434 may be associated with mobile phone 220; the device number 2023459292 may be associated with PDA 218; and the device number 7035678989 may be associated with smart phone 216. In one embodiment, there may be a one-to-one relationship between a called DN and a mailbox ID, such that each called DN is associated with one mailbox ID and vice versa. In an alternative embodiment, multiple devices may be associated with a single mailbox.

Caller DN field 606 may include a device number (e.g., phone number, mobile device number, URI, or URL) associated with the depositing of the corresponding voicemail message. In exemplary message tables 600, the messages identified in records 652-656 were deposited by various different device numbers as indicated in field 606.

State field 610 may include one or more tags identifying the state (e.g., status) of the corresponding voicemail message. Tags in state field 610 may include NEW, HEARD, SAVED, and DELETED. The NEW tag may indicate a voicemail message that has not been listened to yet by the user. The HEARD tag may indicate a voicemail message that has been listened to by the user. The SAVED tag may indicate a voicemail message that the user requested be saved in one of user devices 208-220 and/or one of VM servers 232-236 for a number of days, e.g., 21 days. The DELETED tag may indicate a voicemail message that has been marked for deletion by, for example, a user device. Other tags in state field 610 are possible, such as BUSINESS to identify business voicemail message, PERSONAL to identify personal voicemail message, FAMILY to identify voicemail message from family members, URGENT to identify urgent messages, and NOT URGENT to identify non-urgent messages. State field 610 may include multiple tags.

Audio location field 612 may indicate the location (e.g., filename and/or pathname, URL, or URI) of an audio file associated with the corresponding voicemail message. In one embodiment, the audio file may be stored locally and audio location field 612 may include the filename of the local file associated with the corresponding voicemail message. In another embodiment, the audio file may be stored remotely and audio location field 612 may include the remote location of the audio file associated with the corresponding voicemail message.

Message tables 600 may include additional, different, or fewer fields than illustrated in FIG. 6A. For example, message tables 600 may include a call time field that may include the date and time that the corresponding voicemail message was left in one of VM servers 232-236. As another example, message tables 600 may include a priority field that may specify the urgency (e.g., 1-10) of the corresponding voicemail message.

FIG. 6B is a block diagram of exemplary message tables 600-1', 600-2', and 600-3' (collectively message tables 600'). Message tables 600-1', 600-2', and 600-3' may represent message tables 600-1, 600-2, and 600-3, respectively, but at a different point in time. Message tables 600' may be referred to as "updated message tables 600'." Like exemplary message tables 600, exemplary message tables 600' include records 652, 654, and 656. Unlike message tables 600, however, message tables 600' include records 658, 660, and 662. In particular, message table 600-1' includes record 662 that does not appear in message table 600-1; message table 600-2' includes record 658 that does not appear in message table 600-2; and message table 600-3' includes record 660 that does not appear in message table 600-3. As shown in exemplary message tables 600', records 658, 660, and 662 each include a state of NEW in state field 610.

The data in message tables 600 and 600' are for exemplary purposes only. As shown, for example, message tables 600-1 and 600-1' store information for only one mailbox ID and one called DN (e.g., mailbox ID of MBA1 and called DN of 7035678989). Message tables 600-1 and 600-1' (and the other message tables) may store information for more than one mailbox ID and called DN, however. In addition, message tables 600 and 600' may store thousands or hundreds of thousands of records.

FIG. 7A is a block diagram of an exemplary aggregate message table 700, e.g., a database. Aggregate message table 700 may store information from one or more other message tables, such as message tables 600. Aggregate message table 700 may be stored in one or more of devices 208-220 (e.g., in memory 460 as message table 464). Aggregate message table 700 may also be stored in VVM server 252 (e.g., in memory 560) or another device in network 200.

Like message tables 600, each entry in aggregate message table 700 may include information regarding a different voicemail message. Further, aggregate message table 700 may include the same or similar fields as message tables 600. That is, aggregate message table 700 may include a mailbox ID field 702, a message ID field 704, a called DN field 705, a caller DN field 706, a state field 710, and an audio location field 712. Aggregate message table 700 may also include a V2T status field 714 and a text location field 716. Aggregate message table 700 may include additional, different, or fewer fields than illustrated in FIG. 7.

Fields 702-712 may store the same or similar information as described above for fields 602-612 in FIG. 6A of message tables 600 or 600'. V2T state field 714 (not described above) may indicate the state of a voicemail with respect to sending it to the V2T server 270, receiving the transcribed text, and sending the transcribed text to the appropriate devices. A V2T state of WAITING may indicate that a notice was sent to V2T server 270 of the corresponding voicemail and VVM server 252 is waiting to receive the transcribed text. A V2T state of DELIVERED may indicate that the transcribed text of the corresponding voicemail was received and forwarded to the appropriate devices, such as devices 208-216. A blank V2T status field 714 may indicate that there is no V2T activity (e.g., the device number may not be subscribed to a voice-to-text service). Other state indicators are possible.

Text location field 716 may indicate the location (e.g., filename and/or pathname, URL, or URI) of a text file (e.g., the transcription) associated with the corresponding voicemail message. In one embodiment, the text file may be stored locally and text location field 716 may include the filename of the local file associated with the corresponding voicemail message. In another embodiment, the text file may be stored remotely and text location field 716 may include the remote location of the text file associated with the corresponding voicemail message. In yet another embodiment, text location field 716 may include the text itself rather than the location of the text file.

Exemplary aggregate message table 700 may include records 752, 754, and 756, which may store some of the same information as records 652, 654, and 656, respectively, in message tables 600. Thus, aggregate message table 700 may be considered an "aggregate" table because it aggregates message information from a group of disparate message tables corresponding to different mailboxes, in this case message tables 600. In an alternative embodiment, message table 700 may store data from only one other message table.

FIG. 7B is a block diagram of an exemplary aggregate message table 700', which may represent aggregate message table 700 at a different point in time. Aggregate message table 700' includes records 752, 754, and 756 that also appear in aggregate message table 700. Aggregate message table 700' also includes records 758, 760, and 762 that do not appear in aggregate message table 700. Records 758, 760, and 762 may store the same information as records 658, 660, and 662, respectively, in message tables 600'. As shown, records 758, 760, and 762 each include a state of NEW in state field 710.

The data in aggregate message tables 700 and 700' are for exemplary purposes. Aggregate message tables 700 and 700' as shown, for example, store information for voicemail messages associated with a single user, e.g., the user related to smart phone 216, PDA 218, and mobile phone 220. Aggregate message tables 700 and 700' may store information associated with thousands even hundreds of thousands of users. In addition, aggregate message tables 700 and 700' may store thousands or hundreds of thousands of messages, for example.

FIG. 8A is a block diagram of an exemplary V2T message table 800. V2T message table 800 may store information regarding voicemail messages for transcribing into text. V2T message table 800 may be stored in V2T server 270, for example. Alternatively, V2T table 800 may be stored in one or V2T engine server 272 or any other component 208-268 of network 200.

Each entry in V2T table 800 may include information regarding a different voicemail message. V2T message table 800 may include the same or similar fields as message tables 600 and 700. V2T message table 800 may include a mailbox ID field 802, a message ID field 804, a called DN field 805, time field 806, audio location field 812, VVM state field 813, engine state field 815, and text location field 816.

Mailbox ID field 802, message ID field 804, called DN field 805, audio location field 812, and text location field 816 may store the same or similar information as described above for message tables 600 and/or 700. Time field 806 (not described above) may store the time that V2T server 270 received notice of the corresponding voicemail. V2T server 270 may use the time so that it does not wait indefinitely for V2T engine server 272 to transcribe the audio of the voicemail. Instead, V2T server 270 may wait a period of time, such as three minutes, after the time stored in time field 816 before timing out and so notifying VVM server 252.

VVM state field 813 may store the state of the communications between V2T server 270 and VVM server 252 for the corresponding voicemail. VVM state field 813 may include the following values: PERSISTED, SUCCESS NOTIFIED, or TIMEOUT NOTIFIED. Other values are possible. PERSISTED may indicate that V2T server 270 received and recorded the header information for the corresponding voicemail. SUCCESS NOTIFIED may indicate that V2T server 270 successfully notified VVM server 252 of the transcribed text of the corresponding voicemail. TIMEOUT NOTIFIED may indicate that V2T server 270 successfully notified VVM server 252 that V2T engine server 272 has exceeded its allotted time to transcribe the voicemail and that no transcribed text has yet to be received. In this case, VVM server 252 may decide, for example, to notify devices, such as devices 208-220 of a received voicemail.

Engine state field 815 may store the state of the communications between V2T server 270 and V2T engine server 272 for the corresponding voicemail. Engine state field 815 may include the following values: PERSISTED, UPLOAD SUCCESS, and UPLOAD ERROR. PERSISTED may indicate that V2T server 270 received and recorded the header information for the corresponding voicemail. UPLOAD SUCCESS may indicate that V2T server 270 has successfully uploaded the corresponding audio file (e.g., the audio file identified in audio location field 812) to V2T engine server 272. V2T server 270 may determine that an upload was a success, for example, by receiving an acknowledgement from V2T engine server 272 that it successfully received the audio file. UPLOAD ERROR may indicate that V2T server 270 attempted to upload the corresponding audio file to V2T engine server 272, but that the upload was not a success. V2T server 270 may determine that an upload was not successful (resulting in an error) when, for example, it receives an error message in the acknowledgement from V2T engine server 272 or when it does not receive an acknowledgement at all from V2T engine server 272.

V2T message table 800 includes records 852 and 856, may store some of the same information as records 752 and 756, respectively, in aggregate message table 700. FIG. 8B is a block diagram of an exemplary V2T message table 800', which may represent V2T message table 800 at a different point in time. In addition to records 852 and 856, V2T message table 800' also includes records 858 and 862 that do not appear in V2T message table 800. Records 858 and 862 may store some of the same information as records 758 and 762, respectively, in aggregate message table 700.

The data in V2T message table 800 and V2T message table 800' are for exemplary purposes. V2T message table 800 and V2T message table 800' may store information associated with thousands or even hundreds of thousands of users and may store thousands or hundreds of thousands of messages, for example.

FIG. 9 is a block diagram of an exemplary V2T subscription table 900. Subscription table 900 may store information identifying the user device(s) that are to receive a notification when, for example, a voicemail message is received for a particular mailbox. Subscription table 900 may be stored in SWD server 238 (e.g., in memory 560). Subscription table 900 may also be stored in VVM server 252 or in another device in network 200. In one embodiment, a user may edit and update information stored in subscription table 900 to subscribe or cancel the subscription to a voice-to-text service. The user may use, for example, a browser in computer 208 to edit and update subscription table 900. The user may also call customer service to subscribe to or cancel a subscription to.

Subscription table 900 may include a mailbox ID field 902 and a notification DN field 904. Subscription table 900 may include additional, different, or fewer fields than illustrated in FIG. 9.

Mailbox ID field 902 may include a value identifying a mailbox in one of the VM servers, such as one of VM servers 232-236. In exemplary subscription table 900, there are three mailboxes identified in mailbox ID field 902: MBA1, MBB1, and MBC1. These three mailboxes correspond to the mailboxes stored in message tables 600 and aggregate message table 700, for example.

Notification DN field 904 may include the device number (s) (e.g., phone number, mobile device number, URI, or URL) that may receive transcribed voicemail text when it becomes available. Field 904 may also identify devices numbers that receive voicemail message information notifications for the mailbox IDs identified in field 902. Field 904 may also indicate whether V2T server 270 may receive voicemail message information notifications for the mailbox IDs identified in field 902.

Subscription table 900 indicates that V2T server 270 and devices may be notified in three different ways. An entry of "V2T&DN" (where DN represents a device number) may indicate that V2T should be notified at approximately the same time as the device associated with the device number and that the transcribed text should be sent to the device subsequently. An entry of "V2T?" after a device number may indicate that the corresponding user device (e.g., devices 208-220) may be given the opportunity of selecting whether to receive transcribed text before sending the transcribed text and/or before sending notification to V2T server 270. A value of "V2T→" before a device number may indicate that V2T server 270 may be notified of a new voicemail before the corresponding device number is notified, and that the corresponding device number should be notified after receiving the transcribed text of the voicemail (e.g., after receiving SUCCESS NOTIFIED or SUCCESS TIMEOUT indications from V2T server 270).

Subscription table 900 indicates that when mailbox MBA1 receives a new voicemail, then the devices associated with device numbers 2022513434, 7035678989, and 2023459292 may be notified. Subscription table 900 also indicates that these devices may be given the option of having their voicemail messages transcribed if the devices choose that option.

Subscription table 900 indicates that when mailbox MBB1 receives a new voicemail, for example, then V2T server 270 may be notified. Subscription table 900 also indicates that the device associated with device number 2022513434 may be notified. In this case, the device and V2T server 270 may be notified of a new voicemail simultaneously. Subscription table 900 also indicates that the device associated with number 2022513434 may receive the transcribed text of the voicemail after VVM server 252 receives it from V2T server 270.

Subscription table 900 indicates that when mailbox MBC1 receives a new voicemail then the user device associated with 2022513434 may be notified. Subscription table 900 also indicates that V2T server 270 may be notified and, after receiving the transcribed text (or timing out), then the device associated with device number 7035678989 may be notified.

Subscription table 900 may include additional, different, or fewer fields than illustrated in FIG. 9. For example, subscription table 900 may include fields that indicate what type of notification messages (e.g., only new messages) should be sent to different devices and when they should be sent.

Figure 10A:
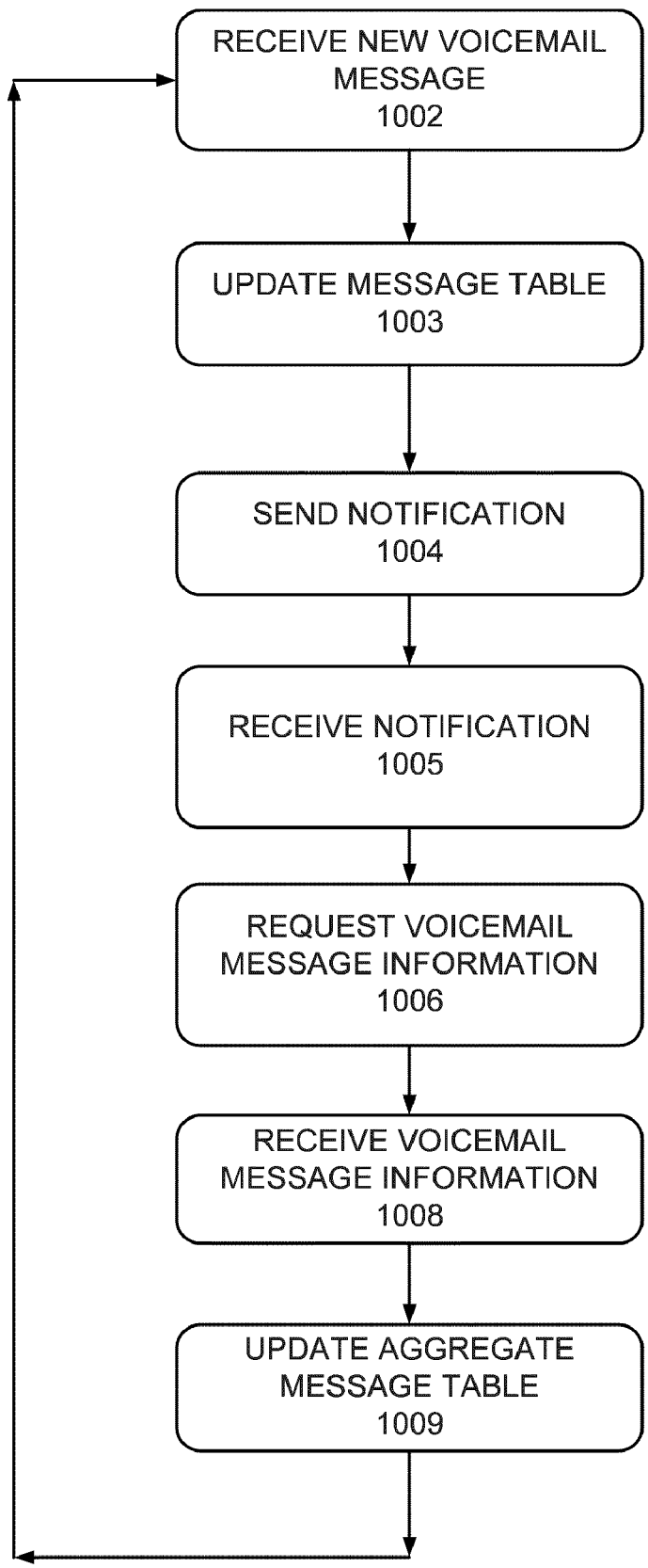
FIG. 10A is a flowchart of an exemplary process for receiving a voicemail message and notifying a visual voicemail server of voicemail information.

FIG. 10A is a flowchart of an exemplary processes 1000A for receiving a voicemail message and for notifying a VVM server of voicemail information. FIG. 10A is described with respect to FIG. 11, which is a diagram of exemplary network signals for notifying a VVM server and a device of voicemail information. For the purposes of FIG. 11, device proxy 254, SMPP gateway 256, notification server 260, and VVM gateway 262 have been omitted for simplicity. All or parts of process 1000A may run in work VM server 232, home VM server 234, wireless VM server 236, VVM server 252, and/or any of user devices 208-220.

Process 1000A may begin when a new voicemail message is received (block 1002). For example, mobile phone 220 (e.g., device number 2022513434) may receive a call request from another device (e.g., device number 4569812124). Mobile phone 220, however, may not accept (e.g., not answer) the call request, which may cause the call request to be directed to wireless VM server 236, and wireless VM server 236 may receive a voicemail message (e.g., an audio file). A message table may be updated (block 1003). Wireless VM server 236 may associate the received voicemail message with a message ID (e.g., a message ID of C130), the called DN (e.g., 2022513434), and the caller DN (e.g., 4569812124) and wireless VM server 236 may store this information in its message table, e.g., message table 600-3' as record 660. Wireless VM server 236 may also store the mailbox ID (e.g., MBC1), the state (e.g., NEW), and the filename of the audio data (e.g., MSG4.QCP) in record 660.

Notification of voicemail message information may be sent (block 1004). Having received a new voicemail (e.g., the voicemail message associated with record 660), wireless VM server 236 may send a notification (signal 1102 in FIG. 11) to VVM server 252 of the new voicemail. The notification message (signal 1102) may include the called DN, e.g., 2022513434 from field 605, and the mailbox ID, e.g., MBC1 from mailbox ID field 602. Wireless VM server 236 may send the notification (signal 1102) to VVM server 252 through notification server 260 (shown in FIG. 2), for example. In one embodiment, the notification message (signal 1102) may include an SMPP message. In one embodiment, the change of the message table in the VM server (e.g., the addition of record 660 to message table 600-3' in wireless VM server 236) may prompt the sending of the notification message (signal 1102). In this example, the notification of voicemail message information may be the result of a new voicemail message. Notifications may also be sent for other reasons, such as a state change in state field 610 of a voicemail message. In another embodiment, notification messages, such as signal 1102, may additionally or alternatively be sent on a periodic basis.

The notification of voicemail message information may be received (block 1005). VVM server 252 may receive the notification (signal 1102) of voicemail message information. Voicemail message information may be requested (block 1006). In response to signal 1102, VVM server 252 may send a request (signal 1104) for information regarding the voicemail messages stored by wireless VM server 236. VVM server 252 may send the request (signal 1104) to wireless VM server 236 through VVM gateway 262 (shown in FIG. 2), for example. The request (signal 1104) may include the called DN (e.g., of mobile phone 220 received earlier in signal 1102), the mailbox ID (e.g., MBC1 received earlier in signal 1102), and a personal identification number (PIN) associated with the mailbox ID. In one embodiment, if VVM server 252 does not store the PIN associated with the mailbox ID, then VVM server 252 may request the PIN from mobile phone 220.

Information regarding voicemail messages may be received (block 1008). VVM server 252 may receive voicemail message information (signal 1106) from wireless VM server 236. Wireless VM server 236 may send voicemail message information (signal 1106) in response to receiving the request (signal 1104) for information regarding voicemail messages. Wireless VM server 236 may send the information (signal 1106) to VVM server 252 through VVM gateway 262 (shown in FIG. 2), for example. The voicemail message information (signal 1106) may include a list of voicemail messages (e.g., header information). In one embodiment, the information may include XML formatted data including message IDs and the corresponding state (e.g., the information stored in state field 610).

In the example where mobile phone 220 receives a voicemail message, the information in signal 1106 may include the message IDs of C129 and C130 from message ID field 604. The information in signal 1106 may also include the states associated with the two messages, e.g., NEW for the voicemail message associated with message ID C130 (record 660) and HEARD for the voicemail message associated with message ID C129 (record 654). In one embodiment, signal 1106 may include information related to only the records that prompted notification signal 1102 in the first place, e.g., the records that are new or have changed information. In another embodiment, signal 1106 may include information related to all the records related to the mailbox identified in mailbox ID field 602.

VVM server 252 may update an aggregate message table (block 1009). For example, before receiving the information (signal 1106) regarding voicemail messages, VVM server 252 may store an aggregate message table (similar to aggregate message table 700) which does not include a record corresponding to the information in record 660 of message table 600-3' of FIG. 6B. After receiving the information (signal 1106) regarding voicemail messages, VVM server 252 may update its aggregate message table to include the information in record 760 as shown in aggregate message table 700', which corresponds to record 660 of message table 600-3', e.g., the information of which was received in signal 1106.

In one embodiment, VVM server 252 may request voicemail message information (e.g., by sending signal 1104) on a periodic basis in addition to or alternatively to waiting for a notification (e.g., signal 1102). In this embodiment, VVM server 252 may periodically request voicemail message information from each VM server, such as VM servers 232-236.

Work VM server 232 and home VM server 234 may also implement portions of process 1000A. For example, home VM server 234 may receive a voicemail message (block 1002) for an unanswered call to PDA 218. Information regarding this voicemail may be stored (block 1003) as record 658 in message table 600-2'. Home VM server 234 may send a notification signal (similar to signal 1102) to VVM server 252 (block 1004). VVM server 252 may request (block 1006) and receive (block 1008) voicemail information from home VM server 234. VVM server 252 may update (block 1009) its aggregate message table to include the information in record 758 (the information received from home VM server 234), as shown in exemplary aggregate message table 700'.

Work VM server 232 may also receive a voicemail message (block 1002) for an unanswered call to smart phone 220. Information regarding this voicemail may be stored (block 1003) as record 662 in message table 600-1'. Work VM server 232 may send a notification signal (similar to signal 1102) to VVM server 252 (block 1004). VVM server 252 may request (block 1006) and may receive (block 1008) voicemail information from work VM server 232. VVM server 252 may update its aggregate voicemail message table to include the information in record 762 as shown in aggregate message table 700'.

As shown, in response to a voicemail message left in each of VM servers 232-236, aggregate message table stored in VVM server 252 may be updated from the condition shown in exemplary message table 700 to that shown in shown in aggregate message table 700'. The aggregate message table stored in VVM server 252 may then reflect the current state of messages from the many VM servers, such as work VM server 232, home VM server 234, and wireless VM server 236.

Figure 10B:
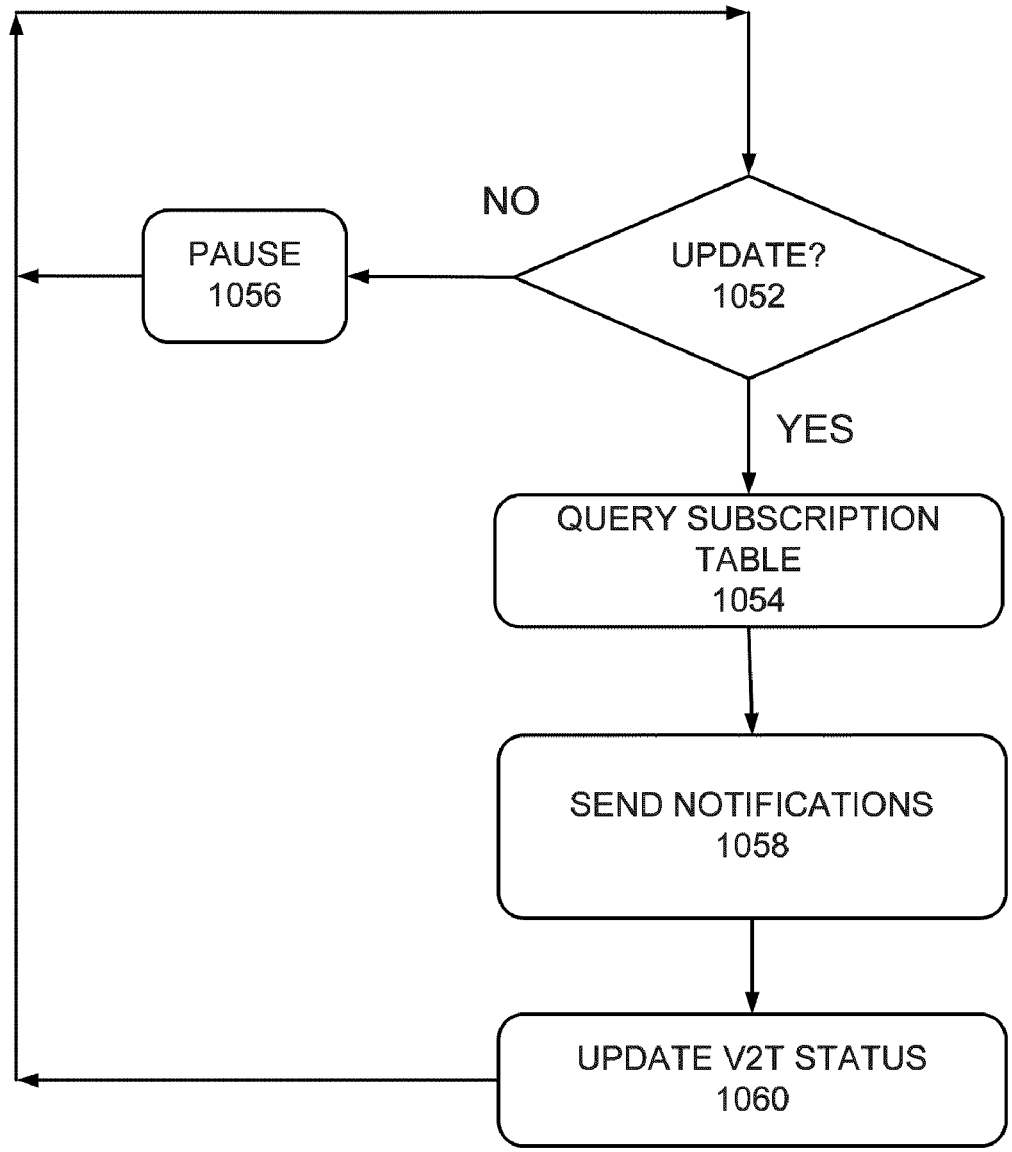
FIG. 10B is a flowchart of an exemplary process for notifying a user device of voicemail message information.

FIG. 10B is a flowchart of an exemplary process 1000B for notifying V2T server 270 and/or a user device of voicemail message information. FIG. 10B is also described with respect to FIG. 11. Process 1000B may begin when VVM server 252 updates its aggregate message table, such as aggregate message table 700. For example, as discussed above with respect to process 1000A, VVM server 252 may have updated its aggregate message from the condition shown in aggregate message table 700 to the state shown in updated aggregated message table 700' (e.g., to add record 760 associated with mailbox MBC1). If the aggregate message table has been updated (block 1052: YES), then a subscription table may be queried (block 1054). VVM server 252 may query subscription table 900 stored in SWD server 238 to determine which user devices should be notified of the change to the aggregate message table and/or whether V2T server 270 should also be notified, and in what order.

In the example above, mobile phone 220 receives a voicemail message corresponding to record 760 (associated with mailbox MBC1) of aggregate message table 700'. In this case, according to subscription table 900, the device associated with number 2022513434 (mobile phone 220) may be notified (e.g., at time Ta) of the new voicemail message (signal 1108). V2T engine server 272 may also be notified (signal 1108) at approximately the same time (e.g., at time Ta) that the device associated with number 2022513434 is notified. After receiving the transcribed text from V2T engine server 272, the device associated with number 7035678989 (smart phone 216) may also be notified (signal 1114). As described below, VVM server 252 may send (e.g., at time Tc) the notification signal to the device associated with number 7035678989 after receiving (e.g., at time Tb) the transcribed text of the voicemail. In this case, a pop-up dialog on the user device may indicate the new voicemail at approximately the same time the device receives the transcribed text. Further, as described below, the device associated with number 2022513434 (mobile phone 220) may also receive the transcribed text of the voicemail, but possibly after a pop-up dialog indicates to the user of the new voicemail.

Figure 11:
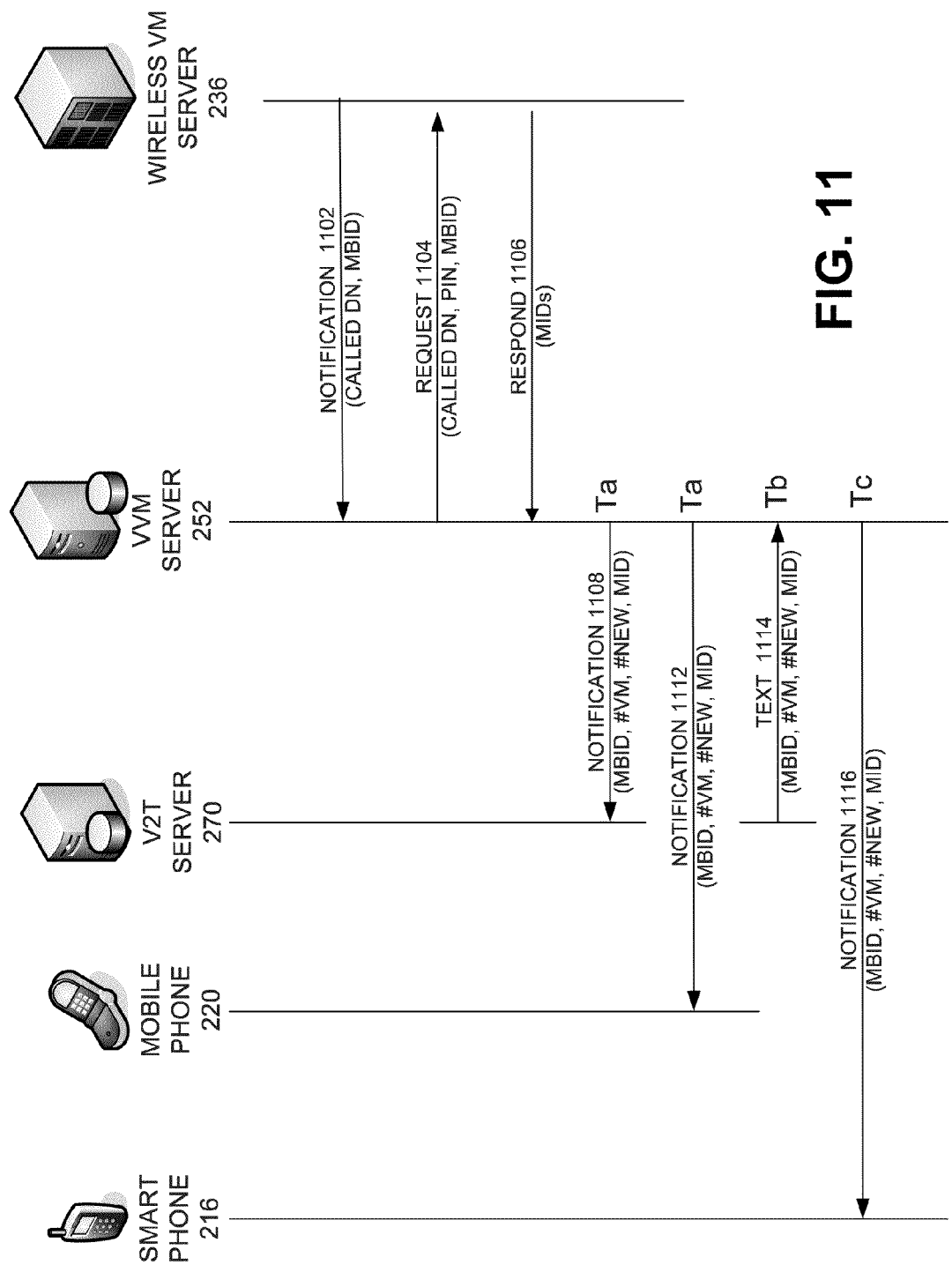
FIG. 11 is a diagram of exemplary network signals for notifying a user device of voicemail message information.

One or more user devices may be notified (block 1058). Exemplary notification messages are shown in FIG. 11, where VVM server 252 sends notification messages (signals 1108 and 1112) to V2T server 270 and mobile phone 220 (e.g., through device proxy 254 and/or SMPP gateway 256, shown in FIG. 2). In one embodiment, signals 1108 and 1112 may include the same or similar information. In another, the signals may be different.

Signals 1108 and 1112 may include, for example, a notice that a new voicemail was received. In one embodiment, the notification (e.g., signals 1108 or 1112) may include, for a particular mailbox ID, the number of voicemail messages (#VM), the number of new messages (#NEW), and the message ID of the most recent new voicemail message. The notification (e.g., signals 1108 or 1112) may also include the mailbox ID to which the notification signal corresponds (e.g., the mailbox ID associated with the change in the aggregate message table that may have resulted in the notification message). In one embodiment, the notification (e.g., signals 1108 or 1112) may also include the message IDs of all the voicemail messages currently in the mailbox.

In one embodiment, the notification (e.g., signal 1112) may include an SMS message. In this embodiment, the SMS message (e.g., signal 1112) may include a BREW (Binary Run Time Environment for Wireless) application message in an SMS message. In another embodiment, the SMS message (e.g., signal 1112) may include a MWI (Mail Waiting Indicator) message.

The V2T status may be determined (block 1060). If aggregate message table 700' was updated with a new voicemail and V2T server 270 was notified of that voicemail, then V2T status field 714 may be changed to WAITING Process 1000B may return to block 1052. In addition, if there has been no update to the aggregate message table (block 1052: NO), then process 1000B may pause (block 1056) and may return to block 1052.

VVM server 252 may later receive the transcribed text for the corresponding voicemail and may update aggregate message table 700' once again with, for example, the location of the text in text location field 716. This update may prompt process 1000B to query subscription table 900 and process 1000B may send another notification to the appropriate user devices. For example, after VVM server 252 receives the transcribed text to the message in record 760 (associated with mailbox MBC1), VVM server 252 may send notice to both the devices associated with numbers 2022513434 and 7035678989. In one embodiment, VVM server 252 may change the state of the voicemail message in state field 719 to NEW to prompt the user devices to download the headers, which may include the text location in field 718.

As shown above with respect to process 1000A, VVM server 252 may update its aggregate message table for mailboxes MBB1 and MBA1, as well as MBC1. These updates may also prompt a query to subscription table 900 (block 1054) and notifications being sent (block 1058). In one embodiment, a notification (e.g., signal 1112) may include information for a group of mailbox IDs, such as MBB1, MBA1, and MBC1. For example, a notification signal may include, for a group of mailbox IDs, the number of voicemail messages (#VM) for each mailbox ID, the number of new messages (#NEW) for each mailbox ID, and the message ID of the most recent new voicemail message for each mailbox ID. In this embodiment, the notification (e.g., signal 1112) may also include the mailbox IDs to which the notification signal corresponds.

As discussed above with respect to FIG. 9, subscription table 900 indicates that a notification for a new voicemail in mailbox MBA1 may be sent to the user devices associated with device numbers 2022513434, 7035678989, and 2023459292 (e.g., mobile phone 220, smart phone 216, and PDA 218, respectively). In this example, a notification for a new voicemail in mailbox MBA1 may be sent to V2T server 270 for transcription, for example, after receiving a request by one of those devices for a transcription of the voicemail.

Subscription table 900 indicates that a notification for a new voicemail in mailbox MBB1 may be sent to the device associated with device number 2022513434 and to V2T server 270. In this example, the device associated with device number 2022513434 may be sent the transcribed text of the voicemail after VVM server 252 receives it.

Figure 12:
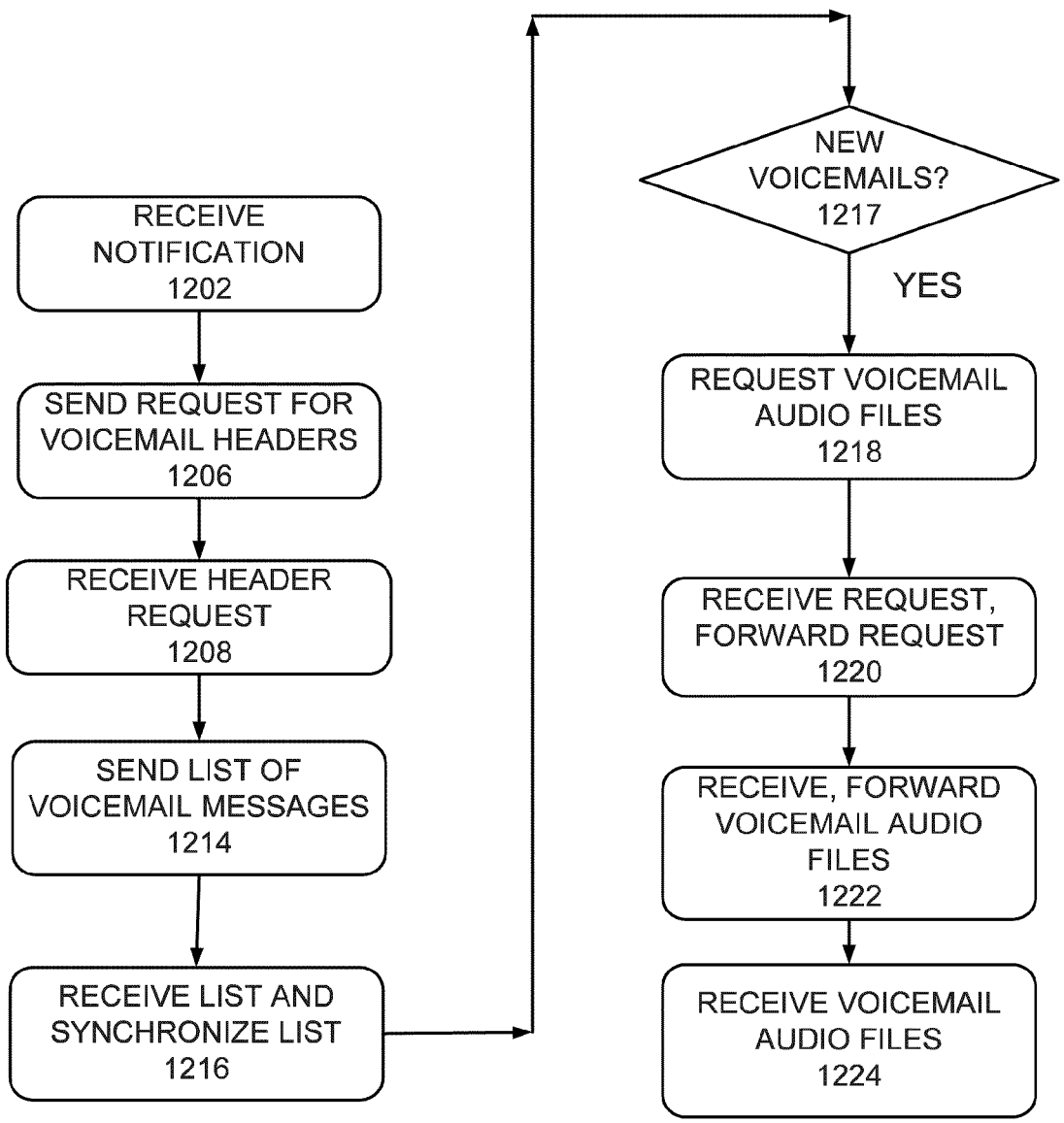
FIG. 12 is a flowchart of an exemplary process for receiving voicemail message information.
Figure 13:
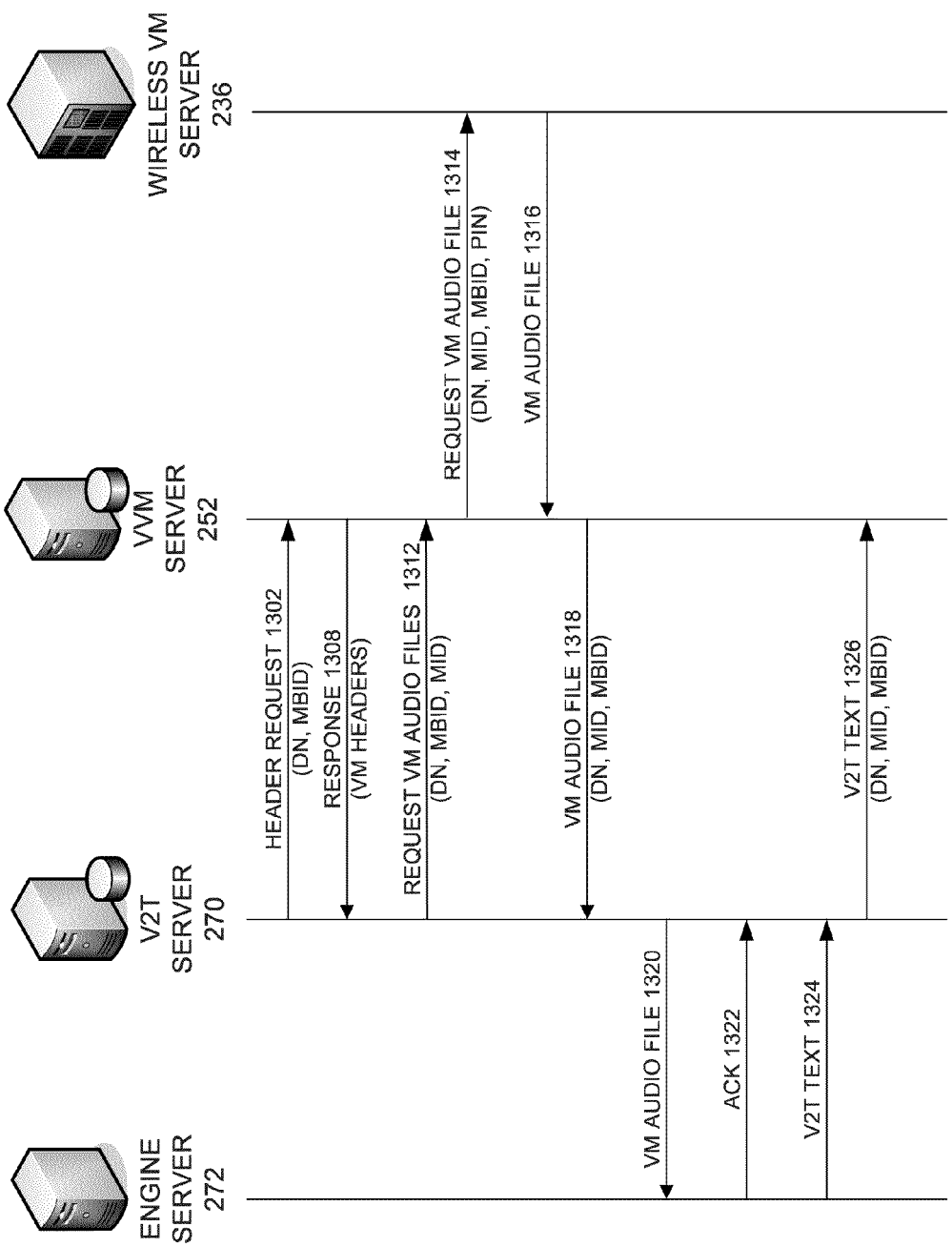
FIG. 13 is a diagram of exemplary network signals for receiving voicemail message information.

After receiving notification of voicemail messages, V2T server 270 may download some or all of the voicemail message information. FIG. 12 is a flowchart of an exemplary process 1200 for receiving voicemail message information. All or parts of process 1200 may be performed by V2T server 270, VVM server 252, or another device in network 200. Process 1200 is described with respect to FIG. 11 and FIG. 13, which are diagrams of exemplary network signals passed in network 200 for receiving voicemail message information. For the purposes of FIG. 12, device proxy 254, SMPP gateway 256, notification server 260, and VVM gateway 262 have been omitted for simplicity.

Process 1200 may start when V2T server 270 receives a notification message, e.g., signal 1108. In another embodiment, V2T server 270 may synchronize on a periodic basis. A request for voicemail headers may be sent (block 1206). For example, V2T server 270 may send a header request (signal 1302) to VVM server 252. The header request (signal 1302) may include a request for the headers of all voicemails for which VVM server 252 is waiting for a transcription. In another embodiment, the header request (signal 1302) may include a request for only the header information of the mailbox ID that prompted notification signal 1108. The request (signal 1302) may include the device number (e.g., for mobile phone 220), the mailbox ID, and/or corresponding PIN.

The header request may be received (block 1208). For example, the header request (signal 1302) sent by V2T server 270 may be received by VVM server 252. A list of voicemail messages (e.g., headers) may be sent (block 1214). For example, VVM server 252 may send a list of voicemail message headers (signal 1308) to V2T server 270. In one embodiment, the voicemail headers may include message IDs, mailbox IDs, caller device numbers, and the states of the messages (e.g., information stored in aggregate message table 700). In one embodiment, the voicemail headers may be sent using XML data formatting. In one embodiment, VVM server 252 may send header information for all voicemail messages for which it is waiting for a transcription, whether or not the same header information was previously sent to V2T server 270. In another embodiment, VVM server 252 may send header information for only the device number and the mailbox ID specified in the header request (signal 1302).

For example, the voicemail message headers (signal 1308) sent to V2T server 270 from VVM server 252 may include records 756, 758, and 760 because VVM server 252 is waiting for transcriptions of those voicemail messages. In one embodiment, signal 1308 does not include the audio files themselves (e.g., MSG*.QCP), but may include the names of the audio files. In another embodiment, signal 1308 may include the audio files themselves.

The voicemail message list may be received and synchronized (block 1216). V2T server 270 may compare the voicemail message headers received in signal 1308 with voicemail message information stored in V2T server 270 and may update V2T message table 800. For example, V2T server 270 may update its message table from the condition shown in V2T message table 800 to that shown in V2T message table 800'. If V2T server 270 does not include a message table with any information, then V2T server 270 may generate a message table corresponding to aggregate message table 800'. V2T server 270 may record the time the voicemail message information was received (or when notification signal 1108 was received). For example, as shown in time field 806 in V2T message list table 800', record 852 and 856 were received at time T1. Records 858 and 860 were received at time T2.

If the message list 800' includes new voicemail messages, e.g., those messages for which V2T server 270 does not have audio files (block 1217: YES), then voicemail audio files may be requested (block 1218). For example, V2T server 270 may not have the audio files of new voicemail messages, such as those found in records 858 and 860. In this situation, V2T server 270 may send a request message (signal 1312) for the audio file to VVM server 252. The request message (signal 1312) may include the device number, the mailbox ID, and the message ID for the requested audio file.

VVM server 252 may receive the request (signal 1312) and, if it does not already have the requested audio file, may send a request (signal 1314) for the audio files to the appropriate one of VM servers 232-236 (block 1220). The request to wireless VM server 236 (signal 1314) may include, for example, the device number, the PIN stored in device proxy 254 and/or VVM server 252 after authentication, the message ID, and the mailbox ID.

Voicemail audio file(s) may be received and forwarded (block 1222). For example, VVM server 252 may receive the voicemail audio files (signal 1316) and may forward the audio files (signal 1318) to V2T server 270. In one embodiment, V2T server 270 may send multiple audio file request messages (e.g., signal 1312) for each audio file that V2T server 270 decides to download. In another embodiment, the audio file request message (signal 1312) may include multiple mailbox and/or message IDs to identify multiple audio files, e.g., an audio file associated with each message ID.

Figures 14A, 14B:
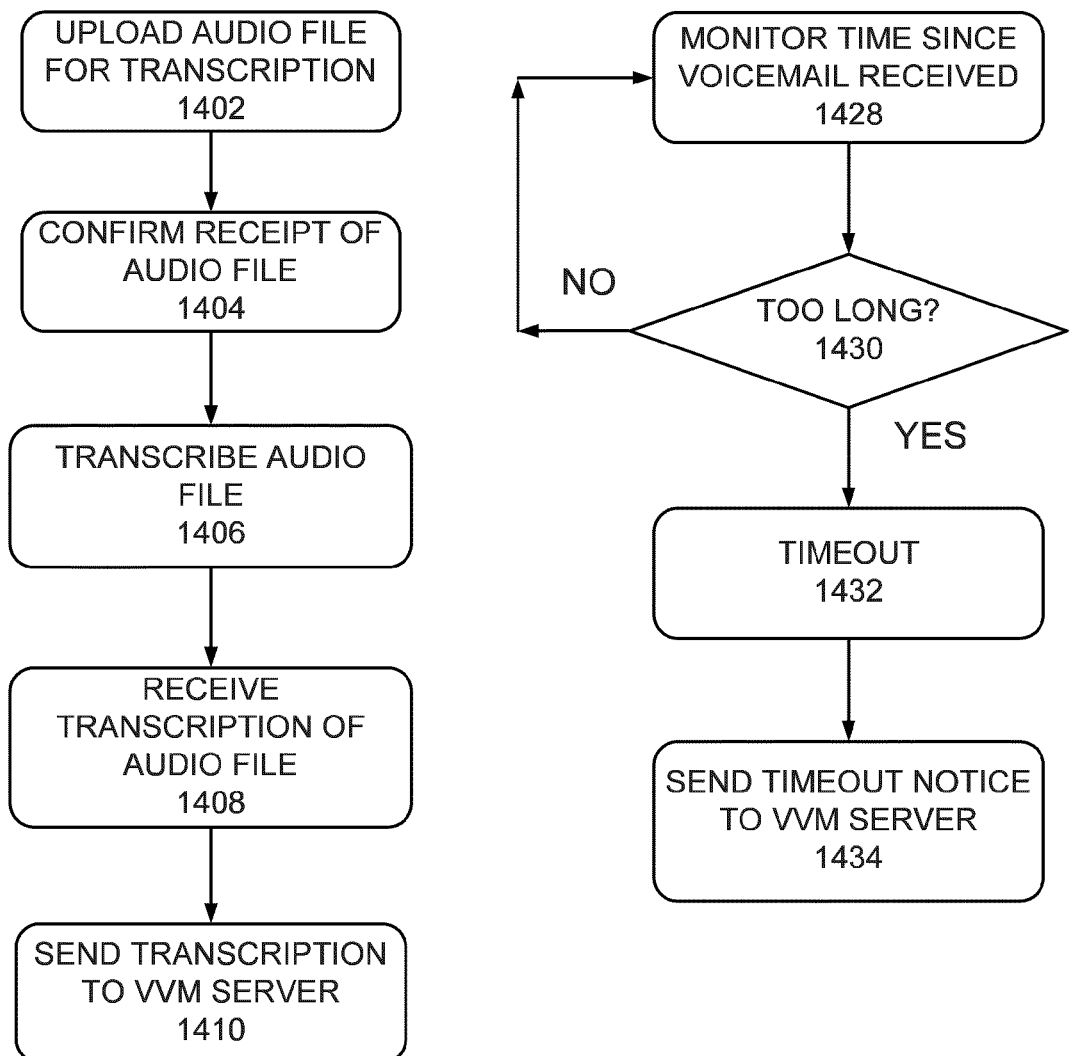
FIGS. 14A and 14B are flowcharts of an exemplary process for transcribing voicemail messages.

FIG. 14A is a flowchart of an exemplary process 1400A for transcribing voicemail messages. FIG. 14A is described with respect to FIG. 13. Process 1400A may be performed by, for example, task manager 562-2 in V2T server 270. Process 1400A may begin when V2T server 270 uploads A voicemail audio file (signal 1320) to V2T engine server 272 (block 1402). V2T server 270 may upload audio files according to a priority. For example, audio files marked PERSISTED in VVM state field 813 may have priority over other states. Audio files may be uploaded in order of the time they were received according to time field 806. Task manager 562-2 may decide when to process tasks (e.g., uploading in block 1402) based on the number of idle processors (e.g., P1 through P4) and a priority of a task. Task manager 562-2 may assign the task to one an idle one of the processors P1-P4.

V2T server 270 may receive confirmation (signal 1322) of a successful upload from V2T engine server 272. In this case, V2T server 270 may change the status in engine state field 710 to UPLOAD SUCCESS. If V2T server 270 does not receive a confirmation of a successful upload from V2T engine server 272 (or if it receives an error message from V2T engine server 272), then V2T server 270 may change the status in engine state field 710 to UPLOAD ERROR.

The audio file may be transcribed (block 1406). V2T engine server 272 may receive the audio file from V2T server 270 and may transcribe the audio file using a machine voice-to-text engine, a human, or both. One transcribed, V2T engine server 272 may send the transcribed text (signal 1324) of the audio file to V2T server 270. The transcription may be received (block 1408). V2T server 270 may receive the transcription (signal 1324) from V2T engine server 272. The transcription may be sent to VVM server 252 (block 1410). V2T server 270 may send the transcription (signal 1326) to VVM server 252. The transcription (signal 1326) may include the device number (DN), the message ID (MID), and the mailbox ID (MID) of the transcribed voicemail.

FIG. 14B is a flowchart of an exemplary process 1400B for monitoring the delay caused by V2T engine server 272. Process 1400B may be performed by, for example, event notifier 562-1 in V2T server 270. Alternatively, process 1400B may be performed by task manager 562-2. Process 1400B may monitor the time since notice of a voicemail (e.g., a voicemail not marked TEXT SAVED) was received (block 1428) by noting the current time and the time in time field 806, for example. If too much time has passed (e.g., more than a threshold, such as 3 minutes), then process 1400B may consider this a timeout (block 1432) and may notify VVM server 252 accordingly (block 1434). In one embodiment, the timeout threshold may be determined based on the length of the voicemail message. For example, the threshold may be 3 minutes plus two times the length of the voicemail itself. The notice to VVM server 252 may include the device number (DN), the message ID (MID), and the mailbox ID (MID) of the corresponding voicemail. V2T server 270 may also mark the corresponding voicemail as SUCCESS TIMEOUT.

Figure 15A:
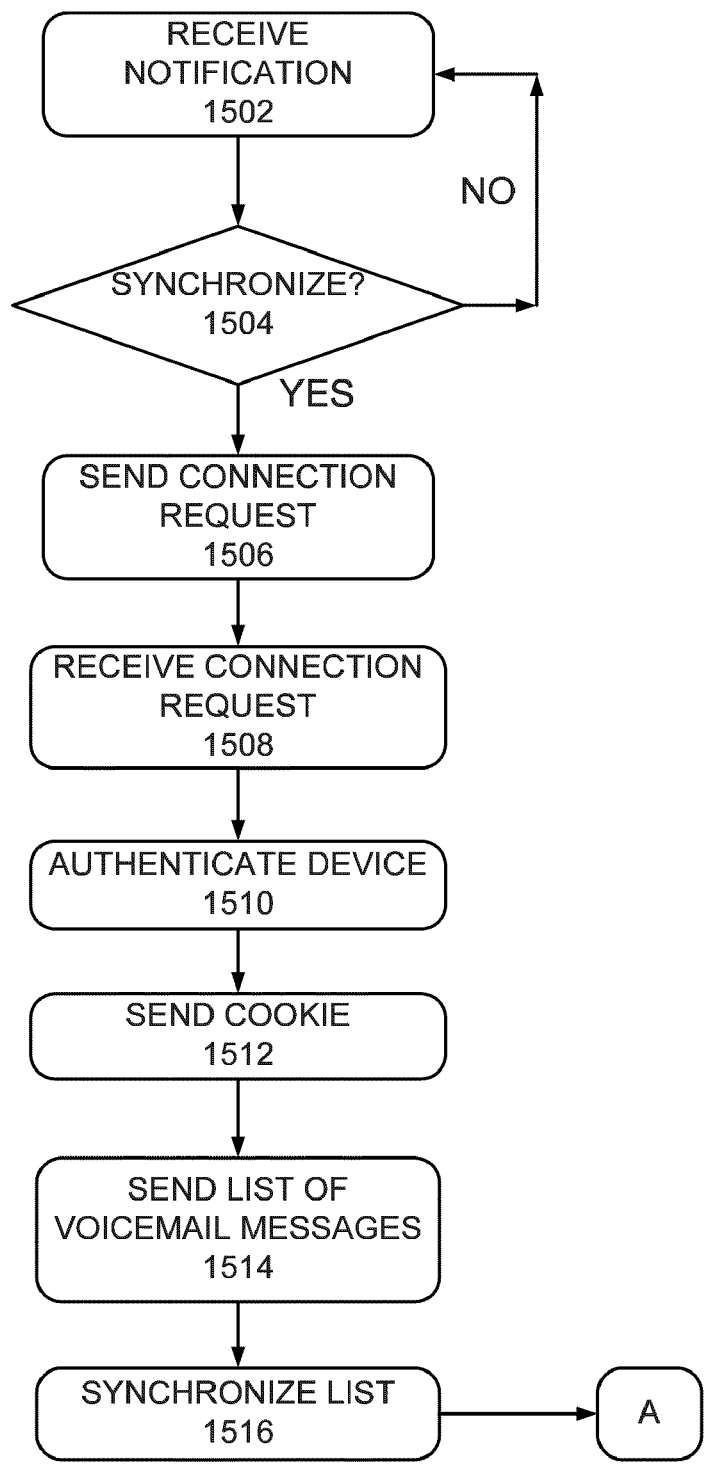
FIGS. 15A through 15C are flowcharts of an exemplary process for receiving voicemail message information including transcribed text.
Figure 15B:
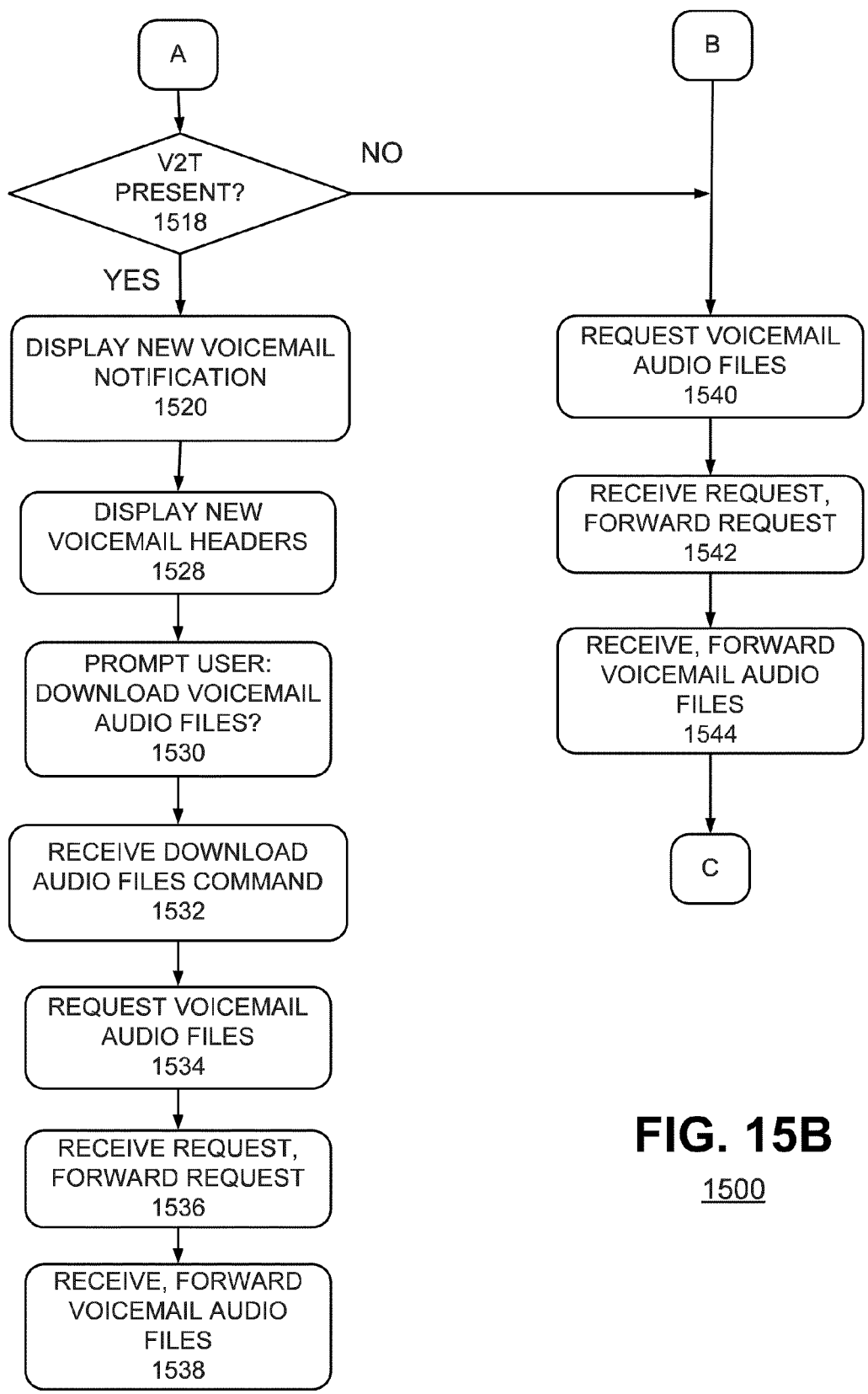
Figure 16:
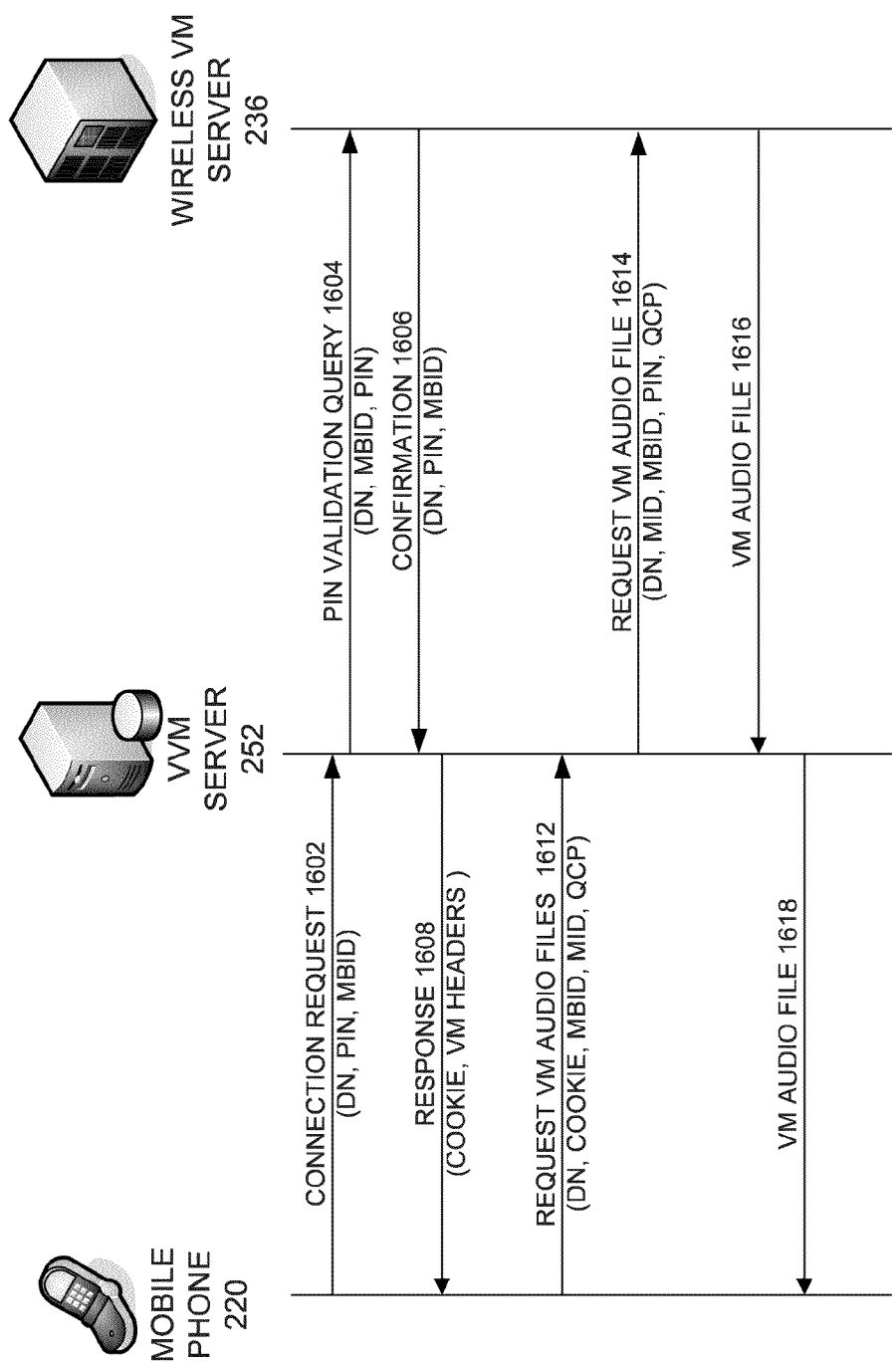
FIG. 16 is a diagram of exemplary network signals for receiving voicemail message information.

A user device, such as mobile phone 220, may receive notice of a new voicemail at approximately the same time as V2T server 270. After receiving notification of voicemail messages, the user device may determine whether to download some or all of the voicemail message information identified in the notification. FIG. 15A is a flowchart of an exemplary process 1500 for receiving voicemail message information. All or parts of process 1500 may be performed by a user device, such as one of user devices 208-220, VVM server 252, or another device in network 200. Process 1500 is described with respect to FIG. 10 and FIG. 16, which are diagrams of exemplary network signals passed in network 200 for receiving a voicemail message and/or authenticating a user device. For the purposes of FIG. 12, device proxy 254, SMPP gateway 256, notification server 260, and VVM gateway 262 have been omitted for simplicity.

Process 1500 may start when a user device receives a notification message, e.g., signal 1112 (block 1502). In one embodiment, the notification (signal 1112) may trigger the launching of VVM application 462. For example, the notification (signal 1112) may trigger the user device to perform process 1500.

A determination of whether to synchronize may be made (block 1504). For example, mobile phone 220 may receive the notification message (signal 1112) and may compare the information in the notification message (signal 1112) with information already stored in mobile phone 220. Mobile phone 220 may determine that it does not have the most recent voicemail message information (block 1504: YES) and may initiate a synchronization with VVM server 252 to receive the most recent voicemail information.

In one embodiment, the user device, e.g., mobile phone 220, may determine whether to synchronize or not based, for a particular mailbox ID, for example, on the number of unheard (e.g., new) messages, the total number of messages, and/or the newest message ID. In yet another embodiment, the user device, e.g., mobile phone 220, may determine whether to synchronize or not based, for a group of mailbox IDs, for example, on the number of unheard messages, the total number of messages, and/or the newest message IDs for the group of mailbox IDs. In another embodiment, the user device, e.g., mobile phone 220, may determine whether to synchronize or not based, for a particular mailbox ID, only on this information (i.e., the number of unheard messages, the total number of messages, and/or the newest message ID). Further, the user device, e.g., mobile phone 220, may determine whether to synchronize or not based, for a group of mailbox IDs, only on this information (i.e., the number of unheard messages, the total number of messages, and/or the newest message IDs for the group of mailbox IDs). In another embodiment, mobile phone 220 may determine whether to synchronize or not based on additional information, such as the full list of voicemail message IDs. In one embodiment, signal 112 may include an indication that new voice-to-text information (e.g., transcription text for a voicemail) is available, and mobile phone 220 may determine whether to synchronize or not based on this information.

The notification (e.g., signal 1112) may include a message that the device should synchronize, without necessarily specifying any other information. In another embodiment, mobile phone 220 may determine whether to synchronize on a periodic basis no matter the information in the notification (signal 1112).

If the notification message (signal 1112), for example, includes a most recent message ID of which mobile phone 220 is unaware, then mobile phone 220 may decide to synchronize (block 1504: YES). If the notification message (signal 1112) indicates that the number of unheard messages is different than the information stored in mobile phone 220, then mobile phone 220 may decide to synchronize (block 1504: YES). If the notification message (signal 1112) indicates that the total number of messages is different than the information stored in mobile phone 220, then mobile phone 220 may decide to synchronize (block 1504: YES). If the notification message (signal 1112) indicates that new transcribed text is available, then mobile phone 220 may decide to synchronize (block 1504: YES). In one embodiment, mobile phone 220 may display the number of unheard (e.g., new)

voicemail messages and the total number of voicemail messages to the user of mobile phone 220.

For example, mobile phone 220 may include an aggregate message table in the state shown in aggregate message table 700, whereas VVM server 252 may include an aggregate message table in the state shown in aggregate message table 700'. The notification message (signal 1112) sent from VVM server 252 to mobile phone 220 may include information regarding aggregate message table 700', such as the total number of voicemail messages (e.g., 2 for mailbox ID of MBC1), the number of new voicemail messages (1 for mailbox ID of MBC1), and the most recent message ID (e.g., C130 for mailbox ID of MBC1). Mobile phone 220 may determine that synchronization should be performed because, comparing the received information (signal 1112) to the information in its aggregate message table (in the state shown in table 700), mobile phone 220 may have incomplete information. For example, the aggregate message table in mobile phone 220 would suggest the number of voicemail messages would be 1 (not 2) and there are no new voicemail messages (rather than 1). In one embodiment, the notification (signal 1112) may include three separate signals, e.g., one for each mailbox ID.

If the user device does not synchronize (block 1504: NO), then process 1500 may return to block 1502. If the user device decides to synchronize (block 1504: YES), then a login or connection request may be sent (block 1506). For example, mobile phone 220 may send a connection request (signal 1602) to VVM server 252 and/or device proxy 254. The connection request may be received (block 1508). The connection request (signal 1602) sent by mobile phone 220 may be received by VVM server 252 and/or device proxy 254. In one embodiment, the connection request (signal 1602) may include a request for voicemail message headers (e.g., a list of voicemail messages). The request for a connection (signal 1602) may include the device number (e.g., for mobile phone 220), the mailbox ID, and/or a PIN. In one embodiment, the user of mobile phone 220 may be prompted for the PIN and/or the PIN may be stored in mobile phone 220 and automatically provided.

In one embodiment, the request for connection (signal 1602) may include information regarding turning on or turning off the voice-to-text features provided by network 200. For example, signal 1602 may include an XML message such as <v2t>TRUE</v2t>. The XML message may include other information, such as the mailbox ID for which the device wishes to receive voice-to-text services and when the device should be notified of new voicemail message (e.g., as soon as possible, when transcription text is available (or timed out)). All the configurations discussed above with respect to subscription table 900 may be configured by commands sent from a user device in, for example, the request for connection (signal 1602).

The user device may be authenticated (block 1510). To authenticate the user device, such as mobile phone 220, VVM server 252 and/or device proxy 254 may send a PIN validation query (signal 1604) to wireless VM server 236. The PIN validation query (signal 1604) may include the PIN and mailbox ID received from the user device, e.g., mobile phone 220, in the login request (signal 1602). Wireless VM server 236 may determine whether the PIN validation message (signal 1604) includes the correct PIN for the device number and mailbox combination. If the PIN validation message (signal 1604) includes the correct PIN, then a confirmation message (signal 1606) may indicate a successful user validation. If the PIN validation message (signal 1604) does not include the correct PIN, then confirmation message (signal 1606) may indicate a failed user validation (e.g., failed authentication). If successful, VVM server 252 and/or device proxy 254 may store the PIN, the mailbox ID, and the device number for subsequent communications with VM servers 232-236.

A cookie may be sent (block 1512). After successful authentication, VVM server 252 and/or device proxy 254 may respond to mobile phone 220 with a login response message (signal 1608). The login response message (signal 1608) may include the device number of mobile phone 220, mailbox ID of mobile phone 220, and a session cookie. In one embodiment, the session cookie may include an expiration time or may be associated with an expiration time. For example, the session cookie may expire after fifteen minutes, one half of an hour, an hour, etc. In one embodiment, authentication server 258 may provide VVM server 252 and/or device proxy 254 with the session cookie for forwarding to mobile phone 220. In one embodiment, the session cookie may be used by mobile phone 220 in future communications to authenticate mobile phone 220. In one embodiment, VVM server 252 and/or device proxy 254 may communicate with authentication server 258 to validate any cookies received from mobile phone 220.

In one embodiment, if the user device, such as mobile phone 220, does not receive a response (signal 1608), then the user device may be in an environment where data transfers are not possible. In this situation, the user device may implement the traditional user interface (TUI) for receiving voicemail message, such as requiring the user to call one of VM servers 232-236. In this situation, the user may use the user device (e.g., mobile phone 220) to call one of VM servers 232-236 directly through the TUI.

A list of voicemail messages may be sent (block 1514). For example, VVM server 252 may send a list of voicemail message headers (signal 1208 of FIG. 12). In one embodiment, the voicemail headers may include a transcription of the voicemail message audio files, if V2T server 270 and V2T engine server 272 have transcribed the voicemail. In one embodiment, the voicemail headers may include message IDs, mailbox IDs, caller device numbers, and the states of the messages (e.g., information stored in a message table). In one embodiment, the voicemail headers may be sent using XML data formatting.

For example, the voicemail message headers (signal 1608) sent to mobile phone 220 from VVM server 252 may include records 752 through 762 of aggregate message table 700. In one embodiment, the messages headers (signal 1608) include the transcribed text (from V2T server 270) if such transcribed text is available. For example, the header may include the following XML string: <v2t>Hello John, I received your email and I'm available for lunch</v2t>. In one embodiment, signal 1608 may only include the names or locations of the transcribed text files.

In one embodiment, signal 1608 may not include the audio files themselves (e.g., MSG*.QCP), but may include the names of the audio files. In another embodiment, signal 1608 may include the audio files themselves. In one embodiment, the voicemail message headers (signal 1608) sent to mobile phone 220 may include only the records from the aggregate message table (in VVM server 252) that have new or changed information. The voicemail message headers (signal 1608) may include headers only to those voicemail mailboxes for which the user device is configured to receive. For example, mobile phone 220 may be configured to receive message headers for mailboxes MBA1, MBB1, and MBC1 as configured and stored in SWD 238.

The voicemail message list may be synchronized (block 1516). For example, mobile phone 220 may compare the voicemail message headers received in signal 1608 with voicemail message information stored in mobile phone 220 and may update its message table. For example, mobile phone 220 may update its aggregate message table from the condition shown in message table 700 to that shown in aggregate message table 700'. If mobile phone 220 does not include a message table with any information, then mobile phone 220 may create a message table corresponding to aggregate message table 700'.

Figures 17A, 17B, 17C:
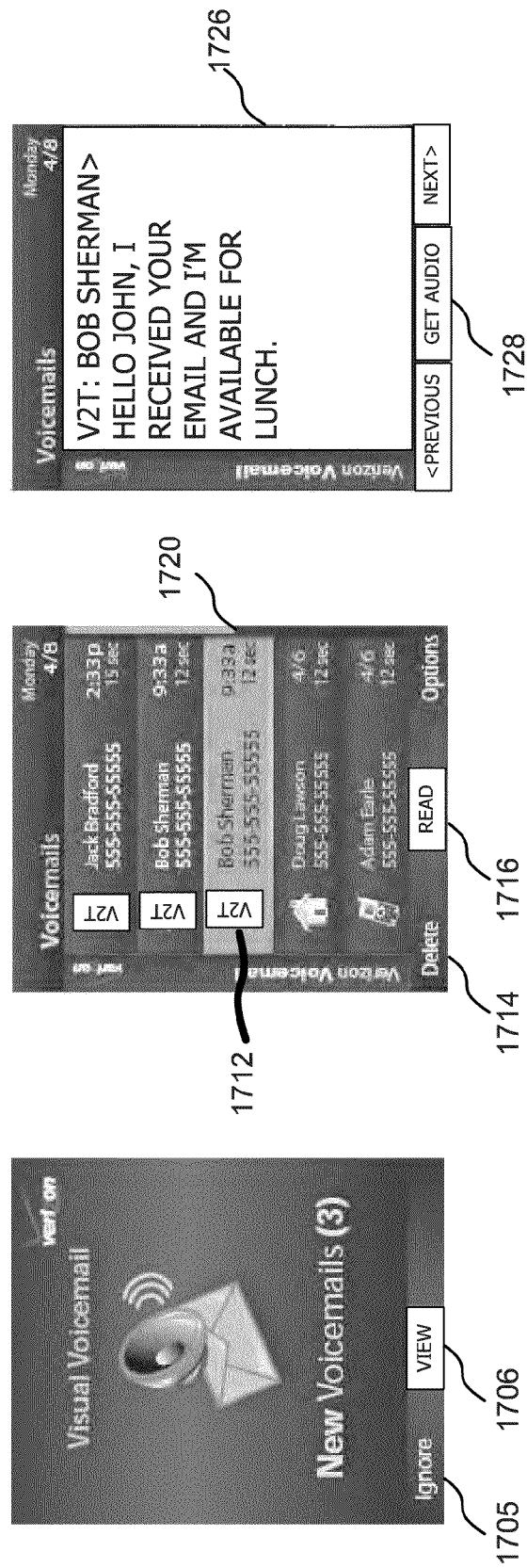
FIGS. 17A-17C and 18A-18D show exemplary visual voicemail voice-to-text graphical user interfaces.

If transcribed text of the voicemail messages is present (block 1518: YES), then a new voicemail notification message may be displayed on the device (block 1520). FIG. 17A shows an exemplary pop-up screen for notifying a user that there are three new voicemail messages waiting in the user's voicemail box. FIG. 17A also shows that the user may select to ignore the voicemail messages (e.g., using option 1705) or view the list of voicemail messages (e.g., using option 1706).

The new voicemail message headers may be displayed (block 1528). For example, if the user selects to view to the voicemail messages (e.g., using option 1706), the user may be presented with the GUI shown in FIG. 17B. FIG. 17B shows an exemplary list of voicemail messages including, for each voicemail, the name of the caller, the phone number of the caller, the time of the call, and the length of the voicemail message. In the exemplary GUI of FIG. 17B, the user may scroll to and select any of the listed voicemail messages in any order. For example, a voicemail message 1720 from Bob Sherman is highlighted for selection. The user may delete the selected voicemail message (e.g., using option 1714) or read the transcribed text of the selected voicemail message (e.g., using option 1716). If the user selects to read the transcribed text, the user may be presented with the GUI shown in FIG. 17C, for example.

The user may be prompted regarding whether to download the audio file associated with the transcribed text (block 1220). As shown in FIG. 17C, for example, the user may be presented with option 1728 that the user may select to download the corresponding audio file. If the user selects option 1728, the device receives a download command (block 1532). The voicemail message audio files may be requested (block 1518). For example, mobile phone 220 may send a request message (signal 1612) for the audio file to VVM server 252. The request message (signal 1612) may include the device number (e.g., of mobile phone 220), the session cookie from the earlier authentication, and the mailbox and message IDs for the requested voicemail audio file. In one embodiment, the request message (signal 1612) may include the file format that the user device supports, such as QCP, MP3, AAC, Ogg Vorbis, etc.

VVM server 252 may receive the request (signal 1612) and, if VVM server 252 does not already have the audio files from a previous request, may send a request (signal 1614) for the audio files to the appropriate one of VM servers 232-236 (block 1536). The request to wireless VM server 236 (signal 1614) may include, for example, the device number (e.g., of mobile phone 220), the PIN stored in device proxy 254 and/or VVM server 252 after authentication, the message ID, the location, the requested file format (e.g., QCP), and the mailbox ID. In one embodiment, the user device requesting an audio file may be a different device than the user device associated with the mailbox ID. For example, mobile phone 220 (associated with wireless VM server 236) may request an audio file from home VM server 234 or work VM server 232, as well as wireless VM server 236.

Voicemail audio file(s) may be received and forwarded (block 1538). For example, VVM server 252 may receive the voicemail audio files (signal 1616) and may forward the audio files (signal 1618) to mobile phone 220. In one embodiment, mobile phone 220 may send multiple audio file request messages (e.g., signal 1612) for each new voicemail message mobile phone 220 downloads. In this embodiment, VVM server 252 may send multiple request messages (e.g., signal 1614) to wireless VM server 236, wireless VM server 236 may respond with multiple messages (e.g., signal 1616), and VVM server 252 may send multiple audio files (e.g., signal 1618) to mobile phone 220.

Alternatively, if transcribed voice-to-text information is not available (block 1518: NO), then the device may request and receive the voicemail audio files (blocks 1540 to 1544, similar to blocks 1534 to 1538 described above) using signals 1612, 1614, 1616, and 1618, also discussed above. In one embodiment, the user device may send the request message (signal 1612) and download the audio files (signal 1618) without user input and before displaying a new voicemail dialog notification (e.g., FIG. 7A). This embodiment is represented by moving to block to block 1540 (path "B") from block 1516 (instead of to block 1518 (path "A") from block 1516). In this embodiment, discussed below, the user may select to read or listen to the voicemail without a download delay between selecting and listening.

Figure 15C:
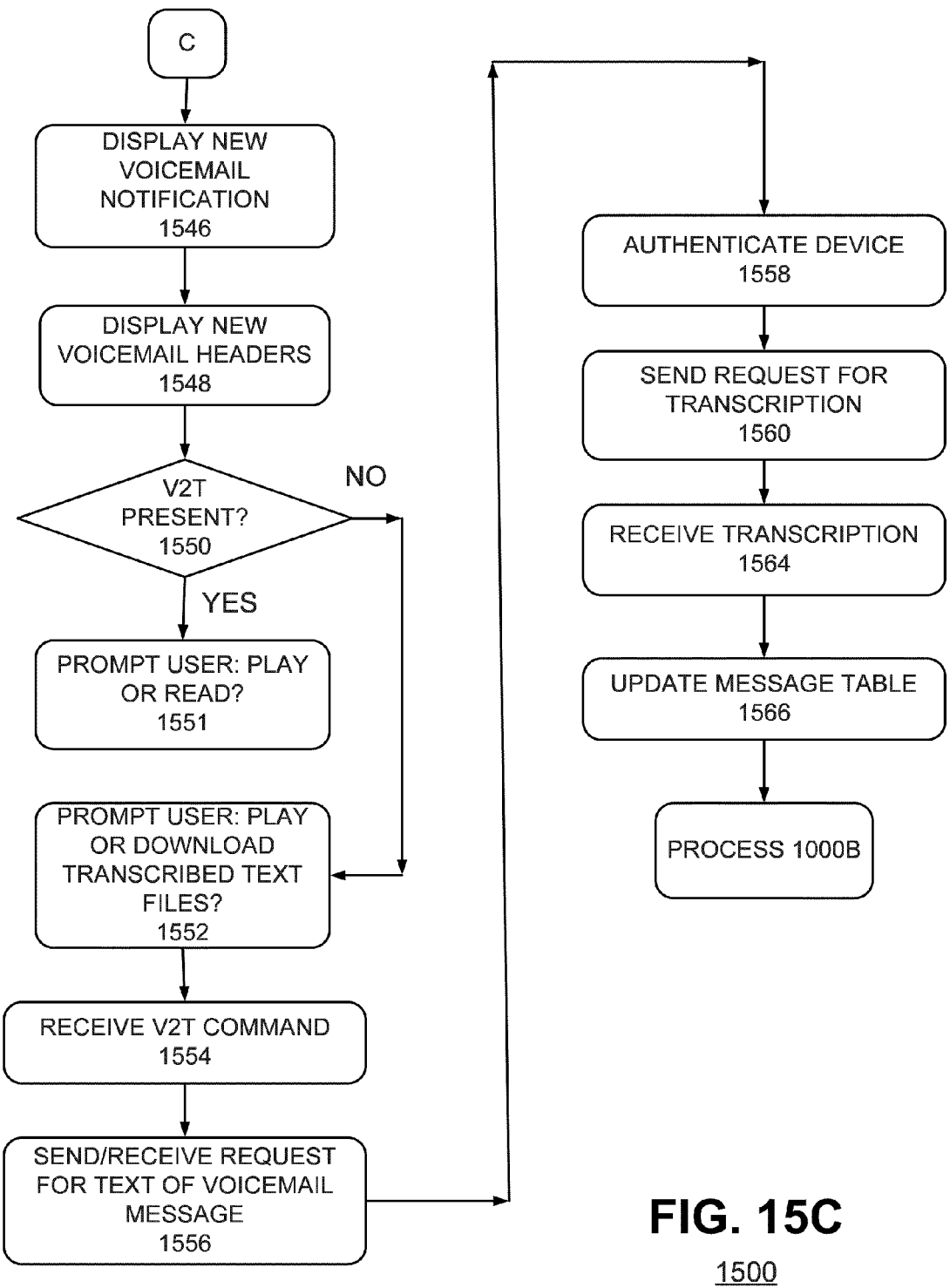

New voicemail notification message may be displayed on the device (block 1546 in FIG. 15C). FIG. 17A shows an exemplary pop-up screen for notifying a user that there are three new voicemail messages waiting in the user's voicemail box. The new voicemail message headers may be displayed (block 1548). For example, if the user selects to view to the voicemail messages (e.g., using option 1706), the user may be presented with the GUI shown in FIG. 18A or FIG. 18C.

Figure 18A:
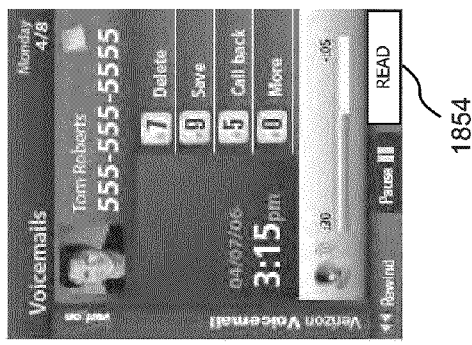

If transcribed text is available (block 1550: YES), the user may be presented with the GUI shown in FIG. 18A. In the GUI of FIG. 18A, the voicemails with text transcriptions may have V2T icon 1712 displayed. The user may scroll to and select any of the listed voicemail messages in any order. For example, a voicemail message 1820 from Bob Sherman is highlighted for selection. The user may be presented with the option of playing (e.g., using option 1850) or reading (e.g., using option 1852 or 1854) the voicemail (block 1551). If the user selects to play (by selecting option 1850) the voicemail, the user may be presented with the GUI shown in FIG. 18B, for example. If the user selects to read (by selecting option 1852) the voicemail, the user may be presented with the GUI displaying the transcribed text, similar to the GUI in FIG. 17C.

If transcribed text is not available (block 1550: NO), the user may be presented with the GUI shown in FIG. 18C. The user may scroll to and select any of the listed voicemail messages in any order. For example, a voicemail message 1820 from Bob Sherman is highlighted for selection. The option of playing or getting the transcribed text may be presented to the user (block 1552). If the user selects to play (by selecting option 1816) the voicemail, the user may be presented with the GUI shown in FIG. 18D, for example. In either the GUI of FIG. 18C or the GUI of FIG. 18D, the user may be presented with the option of downloading the transcribed text of the audio voicemail (e.g., options 1828 and 1830). In one embodiment, the user device may display the transcribed text of the voicemail at the same time as playing the audio of the voicemail.

If the user selects option 1828 or 1830, the device (e.g., mobile phone 220) may receive a V2T download command (block 1554). The V2T text files may be requested (block 1556). For example, mobile phone 220 may send a request message (signal 1902) for the audio file to VVM server 252. The request message (signal 1902) may include the device number (e.g., of mobile phone 220), the session cookie from the earlier authentication (if available), and the mailbox and message IDs for the requested V2T text file. The user device may be authenticated (block 1558). For example, VVM server 252 may use the cookie in the request (signal 1902) to authenticate the user device.

VVM server 252 may send a request (signal 1903) for a transcription of the voicemail (block 1560) and may receive (signal 1903) the transcription (block 1564). These processes 1200, 1400A, and 1400B are described above with respect to FIGS. 12-14. Once the transcription is received, the message table may be updated (block 1566). For example, VVM server 252 may update aggregate message table 700' to include new information in text location field 716. Such an update may trigger process 100B, where an update to message table 700' triggers notification (signals 1906 and 1908) to the proper devices and the proper devices may be updated with the transcribed text of the voicemail. In one embodiment VVM server 252 may send the requested transcribed text in a message (signal 1904) without a separate notification signal. In one embodiment, VVM server 252 may update aggregate message table 700' to change the message status to NEW (e.g., from READ) to prompt user devices to download new header information in process 1400B.

One or more of user device 208-220 may similarly make a determination of whether to synchronize or not (block 1504). A user device may initiate a synchronization process at any time, such as when the device is turned on, on a periodic basis, in response to a user action (e.g., selection of an option on the user device), etc.

Figure 18B:
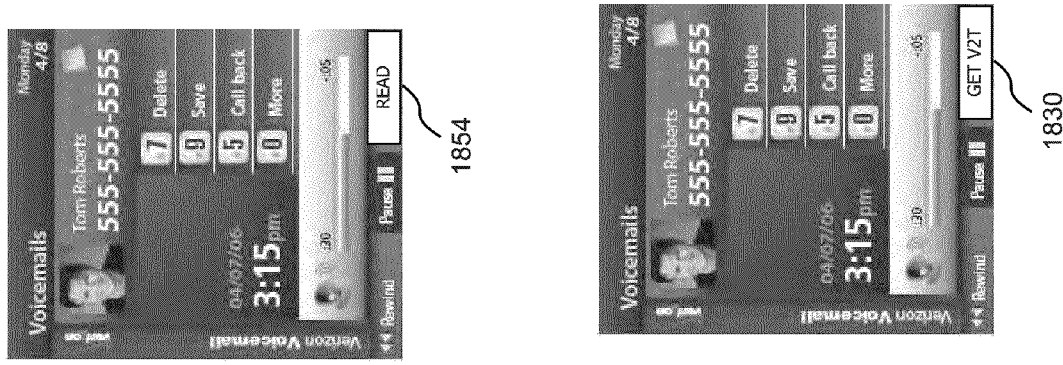
Figure 18C:
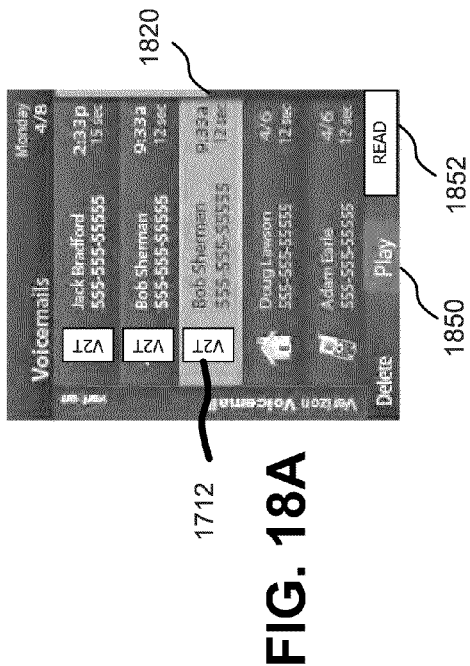
Figure 18D:
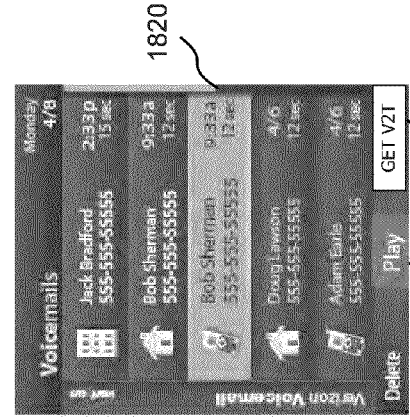
Figure 19:
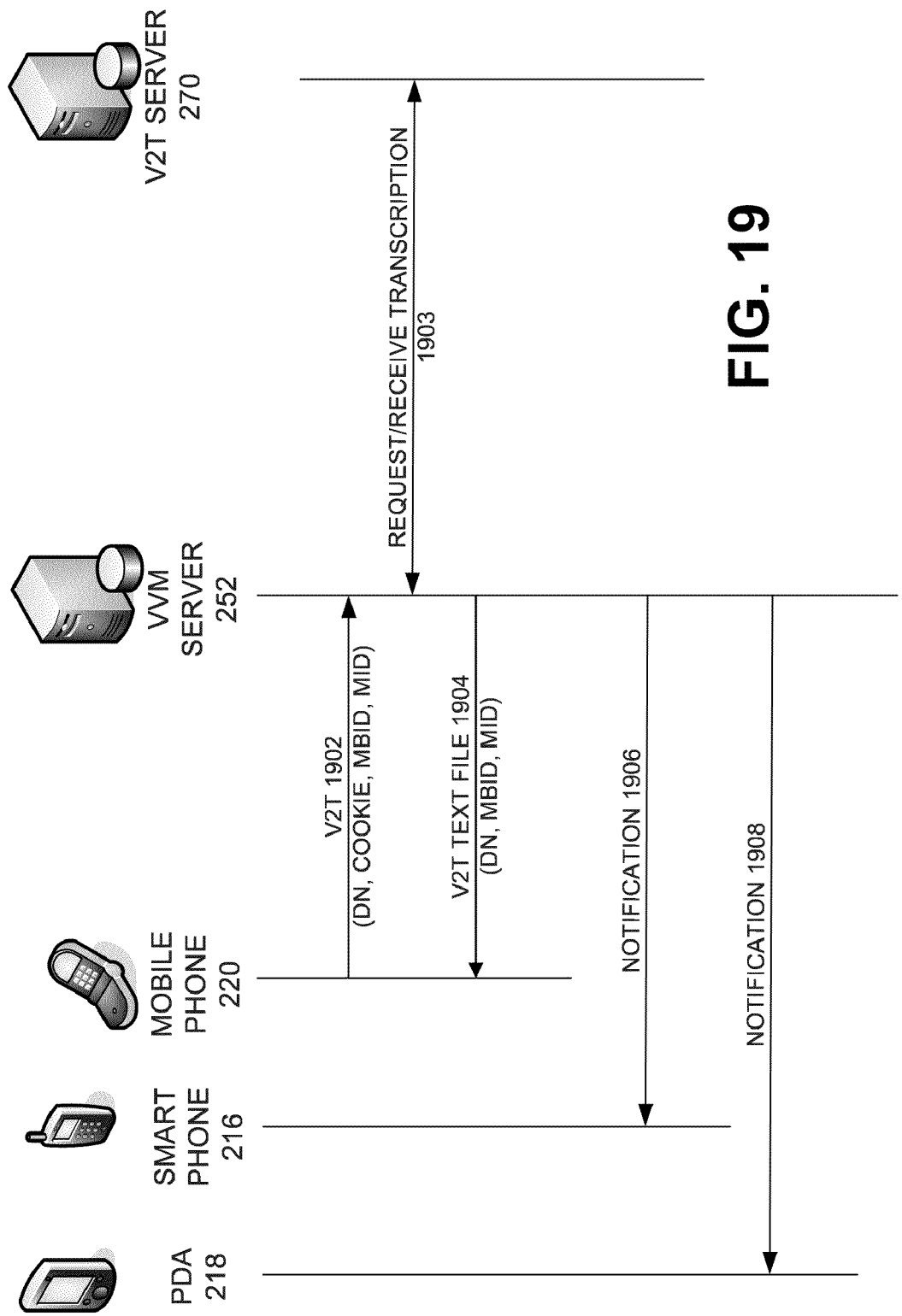
FIG. 19 is a diagram of exemplary network signals for receiving transcribed voicemail messages.
Figure 20A:
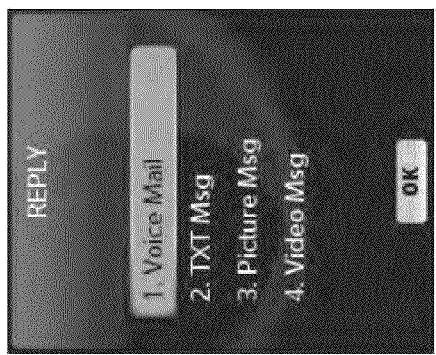
FIGS. 20A-20E show exemplary visual voicemail voice-to-text graphical user interfaces.

As shown in the GUI of FIG. 18D and FIG. 18B, the user may perform actions on voicemail messages, including deleting messages and saving message. When a user deletes a voicemail message, for example, the voicemail message may be deleted from the user device as well as VVM server 252. Users may also replay to voicemail messages or create new voicemail messages from user devices, such as user devices 208-220. As shown in the GUI of FIG. 20A, a user may also reply, forward, and archive voicemail messages, or may compose a new voicemail message. A user may access the GUI of FIG. 20A, for example, by selection an option (not shown).

Figure 20B:
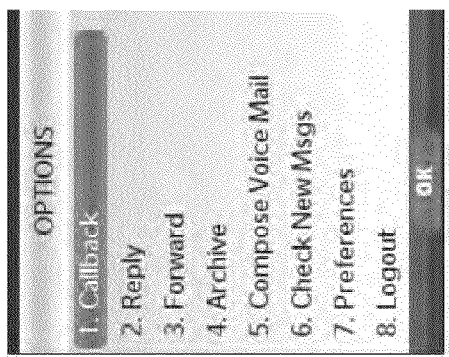
Figure 20C:
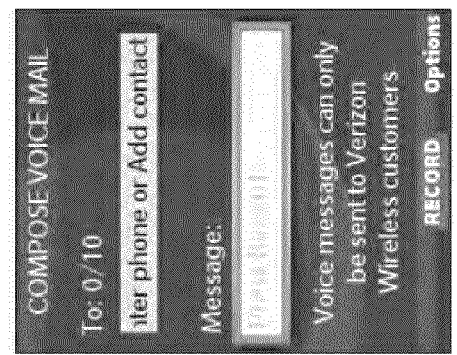
Figure 21:
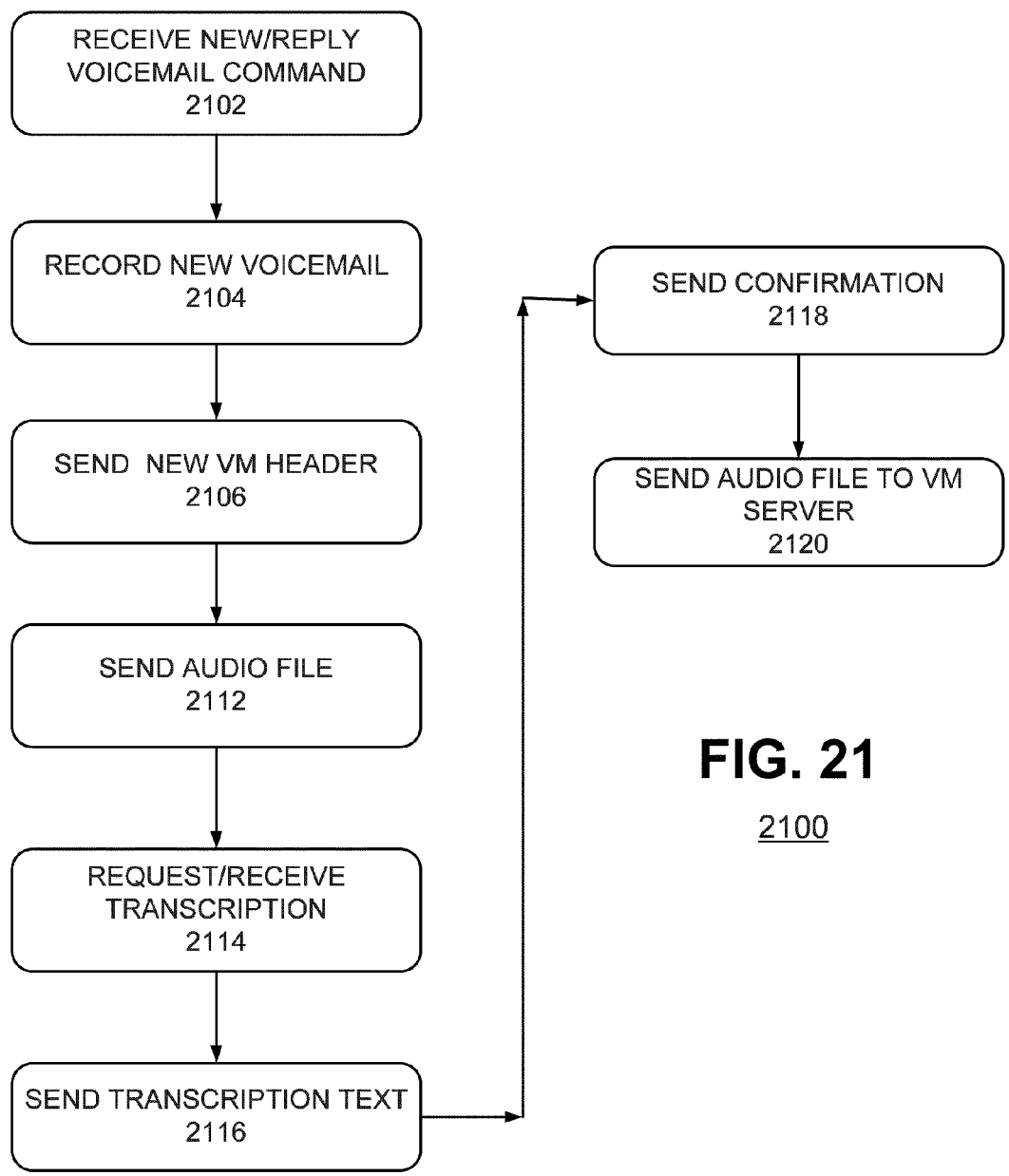
FIG. 21 is a flowchart of an exemplary process for replying to a voicemail message or creating a new voicemail message.
Figure 22:
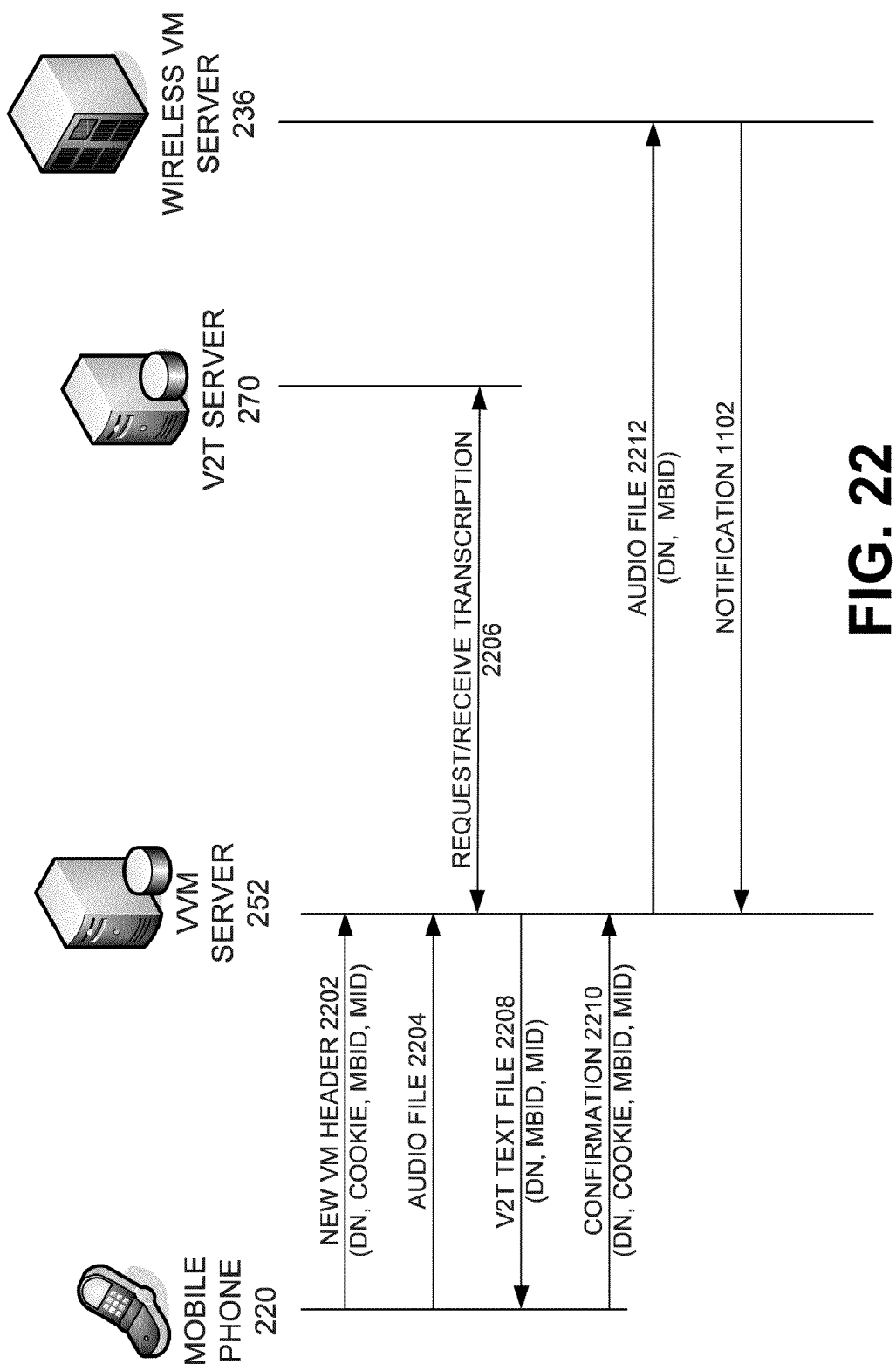
FIG. 22 is a diagram of exemplary network signals for replying to a voicemail message or creating a new voicemail message.

FIG. 21 is a flowchart of an exemplary process for replying to a voicemail message or creating a new voicemail message. A reply-to or new voicemail command may be received (block 2102). FIG. 21 is described with respect to FIG. 22, which is a diagram of exemplary network signals for replying to a voicemail message or creating a new voicemail message. The user device may receive a reply-to or new voicemail command when the user selects option 2 or option 5 in FIG. 20A, for example. The user device may display the GUI of FIG. 20B, for example, if the user selects option 2 (reply); and if the user selections option 1 from the GUI of FIG. 20B, the user device may present the GUI of FIG. 20C. The user device may also display the GUI of FIG. 20C if the user selects to compose a new voicemail (option 5 in the GUI of FIG. 20A).

A new voicemail may be recorded (block 2104). The user may select the RECORD option in the GUI of FIG. 20C to begin to record a new voicemail, and the user device may display the GUI of FIG. 20D. After the recording is complete, a new voicemail header for the new voicemail may be sent (signal 2202) (block 2106) to, for example, VVM server 252. The audio file of the new voicemail may also be sent (signal 2204) (block 2112) to, for example, VVM server 252.

A transcription may be requested and received (block 2114). In one embodiment, VVM server 252 may create a new entry in aggregate message table 700 for the new voicemail. VVM server 252 may send the audio file to V2T server 270. VVM server 252 may send a request (signal 2206) for a transcription of the voicemail (block 2114) and may receive the transcription (signal 2206) (block 1564). These processes 1200, 1400A, and 1400B are described above with respect to FIGS. 12-14. In one embodiment, once the transcription is received, the message table may be updated. The transcribed text may be sent to the user device that requested it (signal 2208)(block 2116).

Figure 20E:
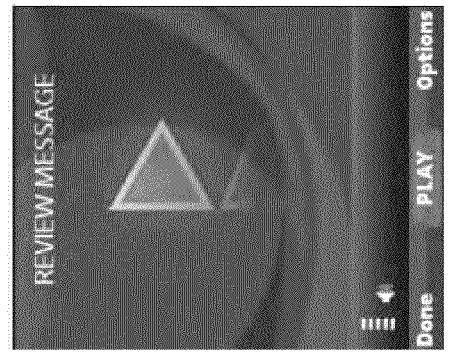
Figure 20D:
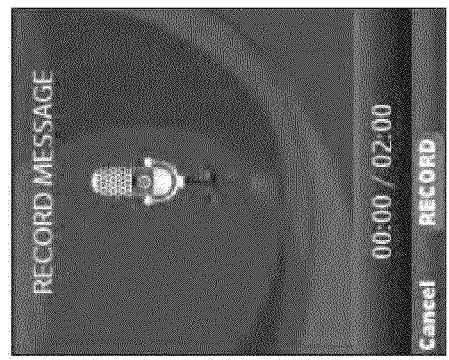

As shown in the GUI of FIG. 20E, the user may review the new voicemail audio and text. If the user is satisfied with the text and audio, the user may send a confirmation (signal 2210) (block 2118). VVM server 252 may send the audio file to the appropriate VM server (block 2120), such as wireless VM server 236. The VM server may send a notification message (signal 1102 shown in FIGS. 21 and 11), which may start the process of FIG. 10A for the delivery of the new voicemail. In another embodiment, the update of aggregate message table with the transcribed text may trigger process 1000B, where the voicemail message is delivered to the appropriate devices.

In one embodiment, the audio file and/or associated text may be sent to an email address, rather than (or in addition to) being sent as to voicemail mailbox. In yet another embodiment, the audio file and/or associated text may be sent by SMS to a destination, rather than (or in addition to) being sent to a voicemail mailbox or an email address.

Figure 23A:
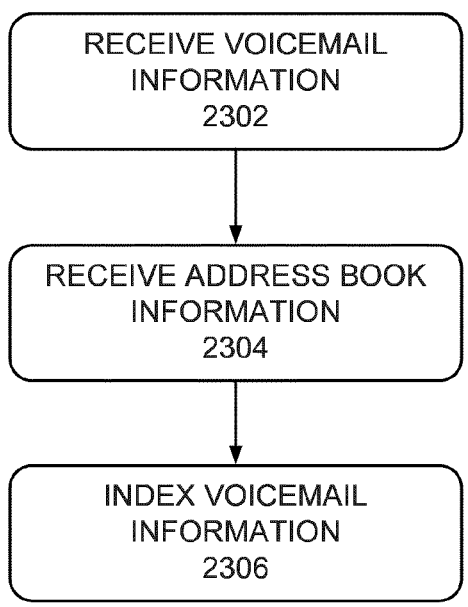
FIGS. 23A and 23B are flowcharts of exemplary processes for storing and searching voicemail information.

FIG. 23A is a flowchart of an exemplary process 2300A for storing and indexing voicemail information. Process 2300A may be performed by search server 274 and/or VVM server 252. Alternatively, process 2300A may be performed by any device in network 200. Process 2300A may begin with search server 274 receiving voicemail information (block 2302). For example, search server 274 may receive voicemail information on a periodic basis from VVM server 252, such as every night. The voicemail information may include the information in aggregate message table 700, for example. Search server 274 may also store the transcribed text (if any) of a voicemail (either a separate text file or in a field similar to text location field 716) and the audio of a voicemail.

Address book information may be received (block 2304). For example, search server 274 may receive the address book information (e.g., contact name and contact number) from user devices, such as user devices 208-220. This information may allow search server 274 to associate device numbers with nicknames and addresses familiar to the user. The voicemail information (including the address book information) may be indexed (block 2306). Search server 274 may index the information for searching by a search engine, which may also be provided for by search server 274. Search server 274 may also index the user's address book information so that user may use his own contact information as part of search queries, for example.

Figure 23B:
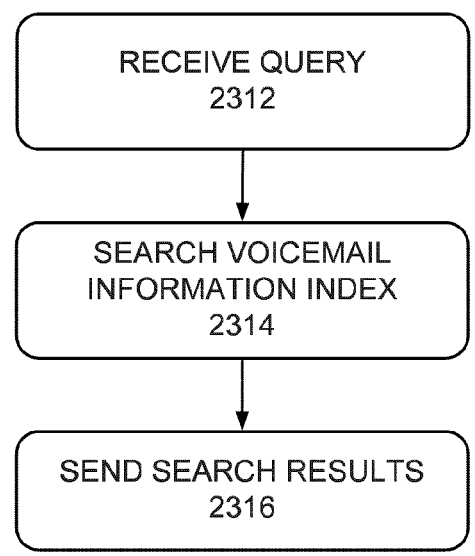

FIG. 23B is a flowchart of an exemplary process 2300B searching voicemail information. A search query may be received (block 2312). For example, search server 274 may receive a search query. The search query may come from a user device, such as mobile phone 220 or computer 208 (e.g., through a browser interface). The query may include the time/date of a call, the calling party, and the called party. The query may also include key words of the transcribed text of voicemails. In one embodiment, the search term may include names and addresses from the user's own address book. In this embodiment, search server 274 may have indexed the user's address book and associated contact information in the user's address book with device numbers. In one embodiment, a user may only search voicemails for which he was the called or calling party. In one embodiment, address book information is received by search server 274 with the search query in process 2300B instead of being received in block 2304.

The voicemail information index may be searched (bock 2314). For example, search server 274 may search the index created in block 2304 according to the query provided in block 2312. The search results may be sent (block 2316). For example, the search results may be displayed on mobile phone 220 or computer 208, depending, for example, on the source of the query. Links to the transcribed text and audio of voicemail messages may be provided in the search results.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

While series of blocks have been described above with respect to different processes, the order of the blocks may differ in other implementations. Moreover, non-dependent acts may be performed in parallel.

It will be apparent that aspects of the embodiments, as described above, may be implemented in many different forms of software, firmware, and hardware in the embodiments illustrated in the figures. The actual software code or specialized control hardware used to implement these embodiments is not limiting of the invention. Thus, the operation and behavior of the embodiments of the invention were described without reference to the specific software code-it being understood that software and control hardware may be designed to the embodiments based on the description herein.

Further, certain portions of the invention may be implemented as "logic" that performs one or more functions. This logic may include hardware, such as an application specific integrated circuit, a field programmable gate array, a processor, or a microprocessor, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system comprising:
one or more servers including:
one or more memories including a first database to store voicemail message information associated with a voicemail mailbox and a user device, and a second database to associate a plurality of user devices with a voice-to-text transcription service;
a receiver to receive a new voicemail message associated with the voicemail mailbox;
a processor to query to the second database to determine whether to request a voice-to-text transcription of an audio file associated with the new voicemail message and to determine whether to notify the user device of the new voicemail message before or after receiving the voice-to-text transcription of the audio file; and
a transmitter to send a notification of the new voicemail message to the user device according to the determination of whether to notify the user device of the new voicemail message before or after receiving the voice-to-text transcription of the audio file.

2. The system of claim 1,
wherein the receiver is configured to receive the transcribed voice-to-text transcription of the audio file; and
wherein the transmitter is configured to send the voice-to-text transcription of the audio file to the user device according the determination of whether to notify the user device of the new voicemail message before or after receiving the voice-to-text transcription of the audio file.

3. The system of claim 2,
wherein the notification causes the user device to determine whether to request a list of voicemail messages associated with the mailbox;
wherein the receiver is configured to receive a request from the user device for the list of voicemail messages associated with voicemail mailbox; and
wherein the transmitter is configured to send to the user device the list of voicemail messages associated with the voicemail mailbox, the list of voicemail messages including the new voicemail message and the voice-to-text transcription.

4. The system of claim 1,
wherein the receiver is configured to receive an indication from the user device to associate the user device with the voice-to-text transcription service for the determination of whether to request a voice-to-text transcription; and
wherein the processor is configured to update the second database according to the received indication.

5. The system of claim 4,
wherein the receiver is configured to receive an indication from the user device to associate the user device with information for the determination of whether to notify the user device before or after receiving the voice-to-text transcription of the audio file; and
wherein the processor is configured to update the second database according to the received indication.

6. The system of claim 4,
wherein the receiver is configured to receive a request from the user device for the transcription of the audio file associated with the new voicemail message.

7. A method comprising:
storing a first database to associate voicemail message information with a voicemail mailbox and a user device;
storing a second database to associate a plurality of user devices with a voice-to-text transcription service;
receiving an indication from the user device to associate the user device with the voice-to-text transcription service;
updating the second database according to the received indication;
receiving a new voicemail message associated with the voicemail mailbox;
querying the second database, in response to receiving the new voicemail message, to determine whether to request a voice-to-text transcription of an audio file associated with the new voicemail message;
transmitting the voice-to-text transcription of the audio file associated with the new voicemail message;
querying the second database to determine whether to notify the user device of the new voicemail message before or after receiving the voice-to-text transcription of the audio file; and
transmitting a notification of the new voicemail message to the user device according to the determination of whether to notify the user device of the new voicemail message before or after receiving the voice-to-text transcription of the audio file.

8. The method of claim 7, further comprising:
requesting the voice-to-text transcription of the audio file associated with the new voicemail message when determined to request the voice-to-text transcription of the audio file, and
wherein transmitting the voice-to-text transcription of the audio file associated with the new voicemail message includes transmitting the voice-to-text transcription of the audio file associated with the new voicemail message to the user device when determined to request the voice-to-text transcription of the audio file.

9. The method of claim 7, further comprising:
receiving the transcribed voice-to-text transcription of the audio file; and
wherein transmitting the voice-to-text transcription includes transmitting the voice-to-text transcription to the user device according the determination of whether to notify the user device of the new voicemail message before or after receiving the voice-to-text transcription of the audio file.

10. The method of claim 9, wherein the notification causes the user device to determine whether to request a list of voicemail messages associated with the mailbox, the method further comprising:
receiving a request from the user device for a list of voicemail messages associated with voicemail mailbox; and
transmitting to the user device the list of voicemail messages associated with the voicemail mailbox, the list of voicemail messages including the new voicemail message and the voice-to-text transcription.

11. The method of claim 7, further comprising:
receiving an indication from the user device to associate the user device with information for the determination of whether to notify the user device before or after receiving the voice-to-text transcription of the audio file; and
updating the second database according to the received indication.

12. The method of claim 9, further comprising:
receiving a request from the user device, initiated by the user of the user device, for the transcription of the audio file associated with the new voicemail message after the transmitting of the notification.

13. A network device comprising:
a memory to store a first database to store voicemail message information associated with a voicemail mailbox and a user device, and a second database to associate a plurality of user devices with a voice-to-text transcription service;
a receiver to receive a new voicemail message associated with the voicemail mailbox;
a processor to query to the second database to determine whether to request a voice-to-text transcription of an audio file associated with the new voicemail message, wherein the receiver receives an indication from the user device to associate the user device with the voice-to-text transcription service for the determination of whether to request a voice-to-text transcription, wherein the processor is configured to request updating of the second database according to the received indication, and
wherein the processor is further configured to determine whether to notify the user device of the new voicemail message before or after receiving the voice-to-text transcription of the audio file; and
a transmitter to send a notification of the new voicemail message to the user device according to the determination of whether to notify the user device of the new voicemail message before or after receiving the voice-to-text transcription of the audio file.

14. The network device of claim 13,
wherein the receiver receives the transcribed voice-to-text transcription of the audio file; and
wherein the transmitter sends the voice-to-text transcription of the audio file to the user device according the determination of whether to notify the user device of the new voicemail message before or after receiving the voice-to-text transcription of the audio file.

15. The network device of claim 14,
wherein the notification causes the user device to determine whether to request a list of voicemail messages associated with the mailbox;
wherein the receiver receives a request from the user device for the list of voicemail messages associated with voicemail mailbox; and
wherein the transmitter sends to the user device the list of voicemail messages associated with the voicemail mailbox, the list of voicemail messages including the new voicemail message and the voice-to-text transcription.

16. The network device of claim 13,
wherein the receiver receives an indication from the user device to associate the user device with information for the determination of whether to notify the user device before or after receiving the voice-to-text transcription of the audio file; and
wherein the processor is configured to update the second database according to the received indication.

17. The network device of claim 13,
wherein the receiver receives a request from the user device for the transcription of the audio file associated with the new voicemail message.

18. A method, comprising:
receiving a new voicemail message in a mailbox, the mailbox being associated with a user device;
querying a database to determine whether to request a voice-to-text transcription of an audio file associated with the new voicemail message, wherein the database associates a plurality of user devices with a voice-to-text transcription service;
receiving a transcription of an audio file associated with the voicemail message when determined that the user device is associated with the voice-to-text transcription service;
sending a notification of the new voicemail message and the transcription of the audio file to the user device when determined that the user device is associated with the voice-to-text transcription service;
storing the transcription of the audio file in a database, wherein the database stores a plurality of transcriptions of audio files of voicemail messages;
receiving a query including search criterion; and
searching the database for transcriptions that meet the search criterion to generate search results,
wherein querying the database includes querying the database to determine whether to notify the user device of the new voicemail message before or after receiving the voice-to-text transcription of the audio file, and wherein sending the notification includes sending the notification based on the determination of whether to notify the user device before or after receiving the voice-to-text transcription of the audio file.

19. The method of claim 18, further comprising:
transmitting the search results to the user device.

20. The method of claim 18, where the search criterion includes a criterion to limit the search results to transcriptions of audio files of voicemail messages for a called device number.

21. The method of claim 18, where the search criterion includes a criterion to limit the search results to transcriptions of audio files of voicemail messages from a caller device number.

22. The method of claim 18, further comprising:
receiving address book information from the user device; and
storing the address book information in the database, where the query includes a criterion related to the address book information.

* * * * *